US012677231B2

(12) United States Patent
Huang et al.

(10) Patent No.: US 12,677,231 B2
(45) Date of Patent: Jul. 7, 2026

(54) INFORMING IN GROUPS OF IAB MT-DU RESOURCE MISALIGNMENT

(71) Applicant: Telefonaktiebolaget LM Ericsson (publ), Stockholm (SE)

(72) Inventors: Yezi Huang, Täby (SE); Boris Dortschy, Vendelsö (SE); Lei Bao, Gothenburg (SE); Erik Dahlman, Stockholm (SE); Magnus Åström, Lund (SE); Behrooz Makki, Pixbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 279 days.

(21) Appl. No.: 18/270,928

(22) PCT Filed: Jan. 7, 2022

(86) PCT No.: PCT/SE2022/050007
§ 371 (c)(1),
(2) Date: Jul. 5, 2023

(87) PCT Pub. No.: WO2022/150008
PCT Pub. Date: Jul. 14, 2022

(65) Prior Publication Data
US 2024/0064671 A1 Feb. 22, 2024

Related U.S. Application Data

(60) Provisional application No. 63/135,235, filed on Jan. 8, 2021.

(51) Int. Cl.
*H04W 56/00* (2009.01)
*H04W 72/0446* (2023.01)

(52) U.S. Cl.
CPC ... *H04W 56/0015* (2013.01); *H04W 72/0446* (2013.01)

(58) Field of Classification Search
CPC ......... H04W 56/0015; H04W 72/0446; H04W 84/047; H04W 56/0045; H04B 7/15528; H04L 5/1469
See application file for complete search history.

(56) References Cited

U.S. PATENT DOCUMENTS 11,082,941 B2 8/2021 Abedini et al.
11,477,811 B2 10/2022 Islam et al.
(Continued)

FOREIGN PATENT DOCUMENTS

WO 2020056648 A1 3/2020
WO 2020202190 A1 10/2020
(Continued)

OTHER PUBLICATIONS

LG Electronics, "R1-1912265: Discussions on resource multiplexing among backhaul and access links," 3GPP TSG RAN WG1 #99, Nov. 18-22, 2019, Reno, Nevada, 8 pages.
(Continued)

*Primary Examiner* — Diane D Mizrahi
(74) *Attorney, Agent, or Firm* — Withrow & Terranova, PLLC

(57) ABSTRACT

Systems and methods for reducing signaling overhead between an Integrated Access and Backhaul (IAB) node and its parent node when switching between timing alignment cases are disclosed. In some embodiments, the method comprises sending one or more sets of desired numbers of guard symbols for two or more timing switching groups, respectively. The method further comprises receiving one or more sets of provided numbers of guard symbols for the two or more timing switching groups, respectively and deter-
(Continued)

Table 1

| | | MT configuration | | |
|---|---|---|---|---|
| | | DL | UL | Flexible |
| DU configuration | DL-H | DU: can transmit on DL unconditionally; MT: not available. | DU: can transmit on DL unconditionally; MT: not available. | DU: can transmit on DL unconditionally; MT: not available. |
| | DL-S | DU: can transmit conditionally; MT: available on DL. | DU: can transmit conditionally; MT: available on UL. | DU: can transmit conditionally; MT: available on DL & UL. |
| | UL-H | DU: can schedule UL unconditionally; MT: not available. | DU: can schedule UL unconditionally; MT: not available. | DU: can schedule UL unconditionally; MT: not available. |
| | UL-S | DU: can schedule UL conditionally; MT: available on DL. | DU: can schedule UL conditionally; MT: available on UL. | DU: can schedule UL conditionally; MT: available on DL & UL. |
| | F-H | DU: can transmit on DL or schedule UL unconditionally; MT: not available. | DU: can transmit on DL or schedule UL unconditionally; MT: not available. | DU: can transmit on DL or schedule UL unconditionally; MT: not available. |
| | F-S | DU: can transmit on DL or schedule UL conditionally; MT: available on DL. | DU: can transmit on DL or schedule UL conditionally; MT: available on UL. | DU: can transmit on DL or schedule UL conditionally; MT: available on DL & UL. |
| | NA | DU: not available; MT: available on DL. | DU: not available; MT: available on UL. | DU: not available; MT: available on DL & UL. | mining available time resources for uplink transmission and/or downlink reception in two adjacent time units based on one of the one or more sets of provided numbers of guard symbols for one of the two or more timing switching groups that corresponds to timing alignment cases used in the two adjacent time units.

20 Claims, 18 Drawing Sheets

(56)               References Cited

U.S. PATENT DOCUMENTS

| | | |
|---|---|---|
| 11,503,555 B2 | 11/2022 | Nam et al. |
| 11,503,592 B2 | 11/2022 | Korhonen et al. |
| 11,849,419 B2 | 12/2023 | Dahlman et al. |
| 11,902,926 B2 | 2/2024 | Miao |
| 12,213,155 B2 * | 1/2025 | Huang ............... H04W 56/002 |
| 2020/0059879 A1 | 2/2020 | Nam et al. |
| 2022/0015095 A1 | 1/2022 | Liu et al. |
| 2022/0070809 A1 | 3/2022 | Song et al. |
| 2022/0070810 A1 | 3/2022 | Bi et al. |
| 2022/0182977 A1 | 6/2022 | Miao |
| 2022/0183003 A1 | 6/2022 | Wei et al. |
| 2022/0191893 A1 | 6/2022 | Miao |
| 2022/0353830 A1 | 11/2022 | Park et al. |
| 2023/0156635 A1 | 5/2023 | Nam et al. |

FOREIGN PATENT DOCUMENTS

| | | |
|---|---|---|
| WO | 2020204776 A1 | 10/2020 |
| WO | 2021023623 A1 | 2/2021 |

OTHER PUBLICATIONS

Examination Report for European Patent Application No. 20749883.3, mailed Mar. 5, 2024, 5 pages.
Non-Final Office Action for U.S. Appl. No. 17/630,590, mailed Mar. 7, 2024, 11 pages.
Final Office Action for U.S. Appl. No. 17/630,590, mailed Jul. 17, 2024, 13 pages.
Notice of Reasons for Refusal for Japanese Patent Application No. 2023-537703, mailed Jun. 28, 2024, 6 pages.
Author Unknown, "RAN1 Chairman's Notes," 3GPP TSG RAN WG1 Meeting #99, Nov. 18-22, 2019, Reno, Nevada, 133 pages.
Author Unknown, "RAN1 Chairman's Notes," 3GPP TSG RAN WG1 Meeting #98bis, Oct. 14-20, 2019, Chongqing, China, 106 pages.
Author Unknown, "RAN1 Chairman's Notes," 3GPP TSG RAN WG1 Meeting #103-e, Oct. 26-Nov. 13, 2020, Electronic Meeting, 230 pages.
Author Unknown, "Technical Specification Group Radio Access Network; NR; Study on Integrated Access and Backhaul; (Release 16)," Technical Report 38.874, Version 16.0.0, Dec. 2018, 3GPP Organizational Partners, 111 pages.

Author Unknown, "Technical Specification Group Radio Access Network; NR; Physical layer procedures for control (Release 16)," Technical Specification 38.213, Version 16.3.0, Sep. 2020, 3GPP Organizational Partners, 179 pages.
Author Unknown, "Technical Specification Group Radio Access Network; NR; Medium Access Control (MAC) protocol specification (Release 16)," Technical Specification 38.321, Version 16.2.1, Sep. 2020, 3GPP Organizational Partners, 154 pages.
Author Unknown, "Technical Specification Group Radio Access Network; NG-RAN; Architecture description (Release 16)," Technical Specification 38.401, Version 16.3.0, Sep. 2020, 3GPP Organizational Partners, 78 pages.
Ericsson, "R1-2103712: Resource multiplexing and DC in enhanced IAB," 3GPP TSG-RAN WG1 Meeting #104-bis-e, Apr. 12-20, 2021, Electronic Meeting, 17 pages.
Huawei, et al., "R1-1908036: Resource multiplexing between backhaul and access in IAB," 3GPP TSG RAN WG1 Meeting #98, Aug. 26-30, 2019, Prague, Czech Republic, 8 pages.
Huawei, et al., "R1-2004619: Discussion on Guard Symbols in IAB," 3GPP TSG RAN WG1 Meeting #101-e, May 25-Jun. 5, 2020, Electronic Meeting, 2 pages.
LG Electronics, "R1-2110101: Discussions on IAB resource multiplexing enhancements," 3GPP TSG RAN WG1 #106bis-e, Oct. 11-19, 2021, Electronic Meeting, 12 pages.
Qualcomm Incorporated, "R1-1911723: RAN1 agreements for Rel-16 IAB," 3GPP TSG RAN WG1 Meeting #98bis, Oct. 14-20, 2019, Chongqing, China, 20 pages.
Qualcomm Incorporated, "R1-1913600: RAN1 agreements for Rel-16 IAB," 3GPP TSG RAN WG1 Meeting #99, Nov. 18-22, 2019, Reno, Nevada, 29 pages.
International Search Report and Written Opinion for International Patent Application No. PCT/SE2022/050007, mailed Apr. 8, 2022, 11 pages.
Author Unknown, "Technical Specification Group Radio Access Network; NR; Physical channels and modulation (Release 15)," Technical Specification 38.211, Version 15.4.0, Dec. 2018, 3GPP Organizational Partners, 96 pages.
Ericsson, "R1-1906588: IAB resource configuration and multiplexing," 3GPP TSG-RAN WG1 Meeting #97, May 13-17, 2019, Reno, Nevada, 9 pages.
Huawei, et al., "R1-1903939: DL transmission timing alignment for IAB," 3GPP TSG RAN WG1 Meeting #96bis, Apr. 8-12, 2019, Xi'an, China, 6 pages.
Huawei, et al., "R1-1906002: DL transmission timing alignment for IAB," 3GPP TSG RAN WG1 Meeting #97, May 13-17, 2019, Reno, Nevada, 6 pages.
ZTE, et al., "R1-1907667: Summary of 7.2.3.4 Mechanism to support the "case-1" OTA timing alignment," 3GPP TSG RAN WG1 Meeting #97, May 13-17, 2019, Reno, Nevada, 15 pages.
International Search Report and Written Opinion for International Patent Application No. PCT/EP2020/071545, mailed Oct. 21, 2020, 12 pages.
Extended European Search Report for European Patent Application No. 22736961.8, mailed Dec. 3, 2024, 7 pages.

* cited by examiner

Directed Acyclic Graph

Spanning Tree

Table 1

| | | MT configuration | | |
|---|---|---|---|---|
| | | DL | UL | Flexible |
| DU configuration | DL-H | DU: can transmit on DL unconditionally; MT: not available. | DU: can transmit on DL unconditionally; MT: not available. | DU: can transmit on DL unconditionally; MT: not available. |
| | DL-S | DU: can transmit conditionally; MT: available on DL. | DU: can transmit conditionally; MT: available on UL. | DU: can transmit conditionally; MT: available on DL & UL. |
| | UL-H | DU: can schedule UL unconditionally; MT: not available. | DU: can schedule UL unconditionally; MT: not available. | DU: can schedule UL unconditionally; MT: not available. |
| | UL-S | DU: can schedule UL conditionally; MT: available on DL. | DU: can schedule UL conditionally; MT: available on UL. | DU: can schedule UL conditionally; MT: available on DL & UL. |
| | F-H | DU: can transmit on DL or schedule UL unconditionally; MT: not available. | DU: can transmit on DL or schedule UL unconditionally; MT: not available. | DU: can transmit on DL or schedule UL unconditionally; MT: not available. |
| | F-S | DU: can transmit on DL or schedule UL conditionally; MT: available on DL. | DU: can transmit on DL or schedule UL conditionally; MT: available on UL. | DU: can transmit on DL or schedule UL conditionally; MT: available on DL & UL. |
| | NA | DU: not available; MT: available on DL. | DU: not available; MT: available on UL. | DU: not available; MT: available on DL & UL. |

*FIG. 5A*

| MT to DU | DL Tx | UL Rx |
|---|---|---|
| DL Rx | DL Rx | |
| UL Tx | | UL Tx |
| DU to MT | | |
| DL Tx | | |
| UL Rx | | |

*FIG. 7A*

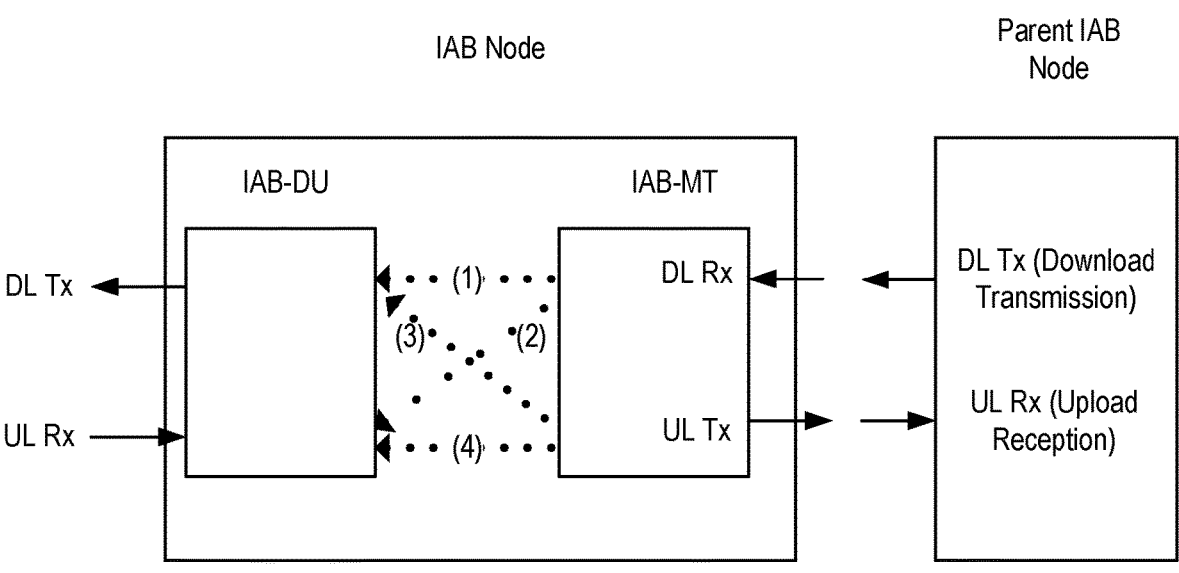
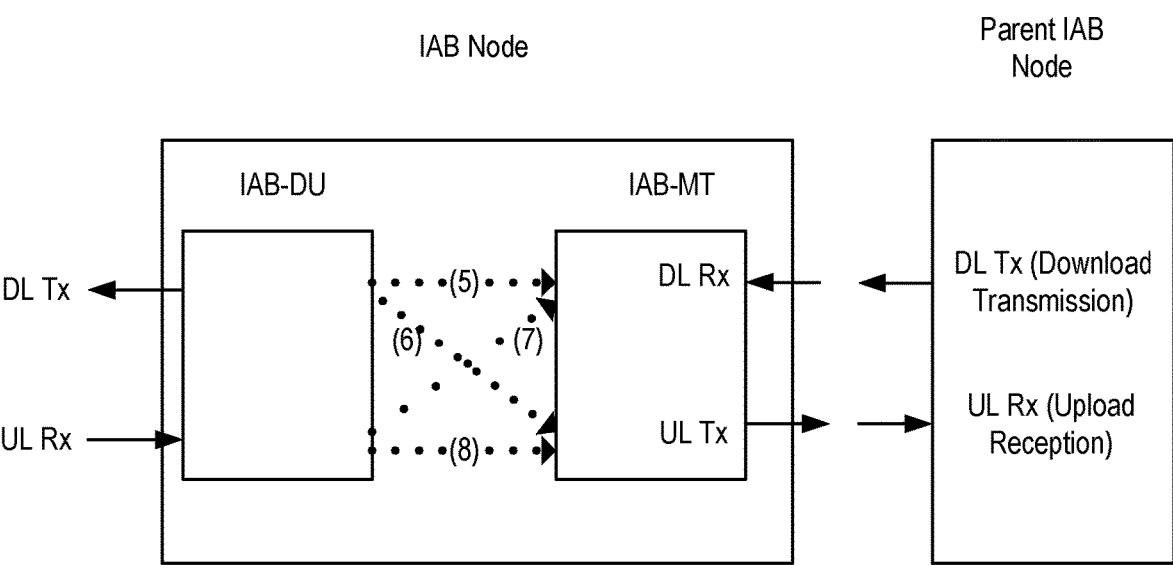
*FIG. 8*

Table 5.18.19-1: Switching scenarios and relevant guard symbols

| Switching scenario | | Field for number of guard symbols in MAC CE |
|---|---|---|
| IAB-MT operation to IAB-DU operation | MT Rx to DU Tx | NmbGS₁ |
| | MT Rx to DU Rx | NmbGS₂ |
| | MT Tx to DU Tx | NmbGS₃ |
| | MT Tx to DU Rx | NmbGS₄ |
| IAB-DU operation to IAB-MT operation | DU Rx to MT Tx | NmbGS₅ |
| | DU Rx to MT Rx | NmbGS₆ |
| | DU Tx to MT Tx | NmbGS₇ |
| | DU Tx to MT Rx | NmbGS₈ |

*FIG. 8A*

Figure 6.1.3.22-1: Guard Symbols MAC CEs

Table 6.1.3.22-2: Subcarrier spacing for Guard Symbols MAC CEs

| Subcarrier spacing | SCS value |
|---|---|
| 15kHz | 00 |
| 30kHz | 01 |
| 60kHz | 10 |
| 120kHz | 11 |

Figure 12:
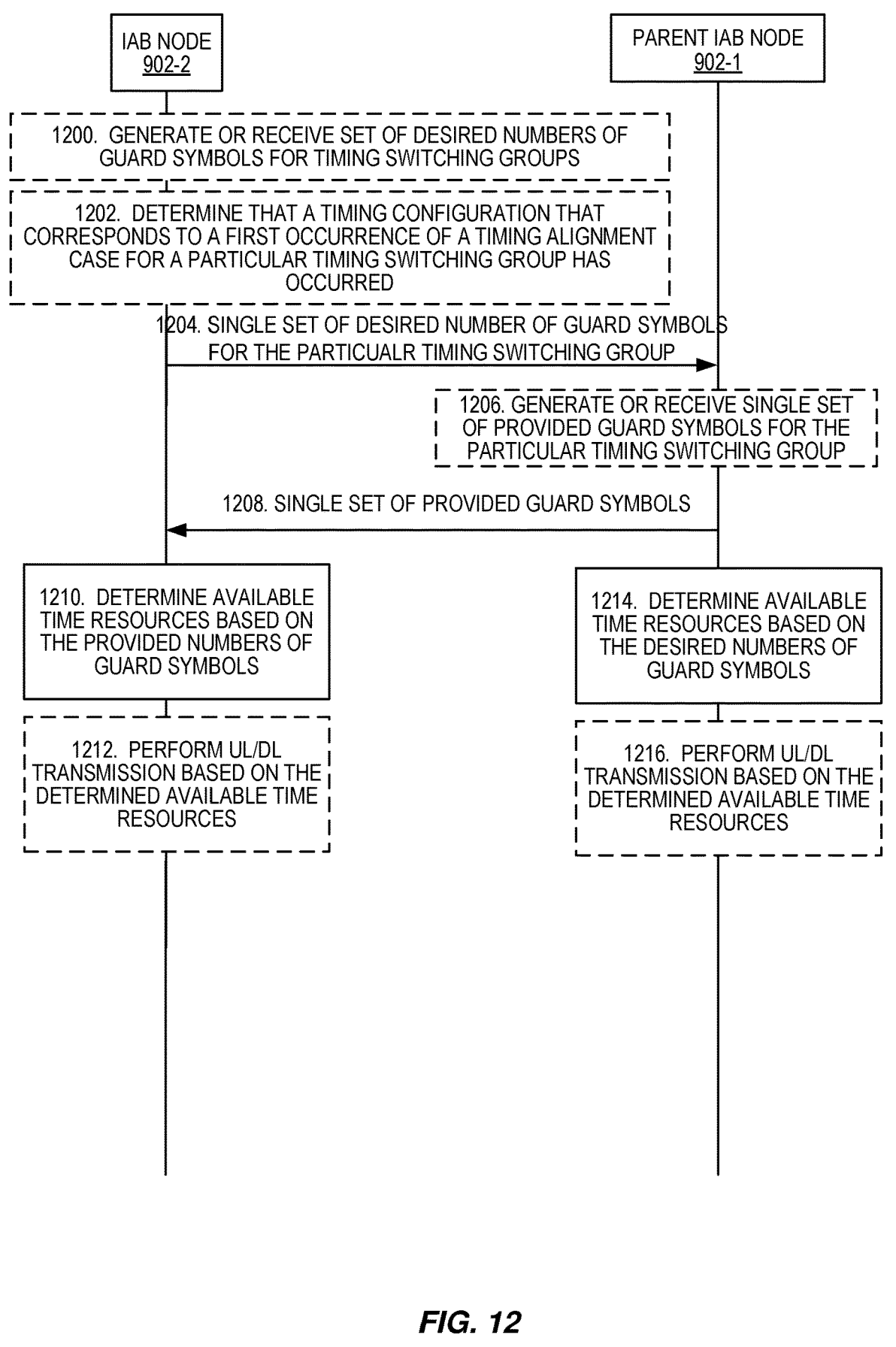

IAB NODE
902-2

PARENT IAB NODE
902-1

1200.  GENERATE OR RECEIVE SET OF DESIRED NUMBERS OF
GUARD SYMBOLS FOR TIMING SWITCHING GROUPS

1202.  DETERMINE THAT A TIMING CONFIGURATION THAT
CORRESPONDS TO A FIRST OCCURRENCE OF A TIMING ALIGNMENT
CASE FOR A PARTICULAR TIMING SWITCHING GROUP HAS
OCCURRED

1204. SINGLE SET OF DESIRED NUMBER OF GUARD SYMBOLS
FOR THE PARTICUALR TIMING SWITCHING GROUP

1206. GENERATE OR RECEIVE SINGLE SET
OF PROVIDED GUARD SYMBOLS FOR THE
PARTICULAR TIMING SWITCHING GROUP

1208. SINGLE SET OF PROVIDED GUARD SYMBOLS

1210.  DETERMINE AVAILABLE
TIME RESOURCES BASED ON
THE PROVIDED NUMBERS OF
GUARD SYMBOLS

1214.  DETERMINE AVAILABLE
TIME RESOURCES BASED ON
THE DESIRED NUMBERS OF
GUARD SYMBOLS

1212.  PERFORM UL/DL
TRANSMISSION BASED ON THE
DETERMINED AVAILABLE TIME
RESOURCES

1216.  PERFORM UL/DL
TRANSMISSION BASED ON THE
DETERMINED AVAILABLE TIME
RESOURCES

INFORMING IN GROUPS OF IAB MT-DU RESOURCE MISALIGNMENT

RELATED APPLICATIONS

This application is a 35 U.S.C. § 371 national phase filing of International Application No. PCT/SE2022/050007, filed Jan. 7, 2022, which claims the benefit of provisional patent application Ser. No. 63/135,235, filed Jan. 8, 2021, the disclosures of which are hereby incorporated herein by reference in their entireties.

TECHNICAL FIELD

The present disclosure is related to systems and methods for reducing signaling overhead between an Integrated Access and Backhaul (IAB) node and its parent node when switching between timing alignment cases.

BACKGROUND

5G Radio Access Network (RAN) Architecture

The current Fifth Generation (5G) RAN architecture is depicted and described in section 6.1.1 ("Overall Architecture of NG-RAN") of Third Generation Partnership Project (3GPP) Technical Specification (TS) 38.401 v16.3.0. The 5G RAN is referred to as the Next Generation RAN (NG-RAN). FIG. 1 illustrates the overall architecture of NG-RAN included in TS 38.401.

The NG-RAN architecture illustrated in FIG. 1 can be further described as follows. The NG-RAN comprises a set of new radio base stations (gNBs) connected to the Fifth Generation Core (5GC) through respective NGs interfaces. A gNB can support Frequency Division Duplex (FDD) mode, Time Division Duplex (TDD) mode or dual mode operation. The gNBs can be interconnected through the Xn interface. A gNB may comprise a gNB Central Unit (gNB-CU) and one or more gNB Distributed Units (gNB-DUs). A gNB-CU and a gNB-DU are connected via F1 logical interface. One gNB-DU is connected to only one gNB-CU. For resiliency, a gNB-DU may be connected to multiple gNB-CUs by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1), the related TNL protocol and the functionality are specified. The TNL provides services for user plane transport and signaling transport.

A gNB may also be connected to a Long Term Evolution (LTE) enhanced node B (eNB) via the X2 interface. Another architectural option is that where an LTE eNB connected to the Evolved Packet Core (EPC) network is connected over the X2 interface with a so called nr-gNB. The latter is a gNB not connected directly to a core network (CN) and connected via X2 to an eNB for the sole purpose of performing dual connectivity.

The architecture in FIG. 1 may be expanded by spitting the gNB-CU into two entities. One gNB-CU User Plane part (gNB-CU-UP), which may serve the user plane and host the PDCP protocol, and one gNB-CU Control Plane part (gNB-CU-CP), which may serve the control plane and may host the Packet Data Convergence Protocol (PDCP) and Radio Resource Control (RRC) protocol. A gNB-DU may host the Radio Link Control (RLC), Medium Access Control (MAC), and Physical (PHY) protocols.

Integrated Access and Backhaul (IAB) Overview

Densification via the deployment of increasing base stations (for example, macro base stations or micro base stations) is one of the mechanisms that can be employed to satisfy the ever-increasing demand for more and more bandwidth/capacity in mobile networks. Due to the availability of more spectrum in the millimeter wave (mmw) band, deploying small cells that operate in this band is an attractive deployment option for these purposes. However, deploying fiber to the small cells, which is the usual way in which small cells are deployed, can end up being very expensive and impractical. Thus, employing a wireless link for connecting the small cells to the operator's network is a cheaper and practical alternative with more flexibility and shorter time-to-market. One such solution is an IAB network, where the operator can utilize part of the radio resources for the backhaul link.

FIG. 2 illustrates an example of an IAB deployment that supports multiple hops. The IAB-donor node (in short, IAB-donor) has a wired connection to the core network and the IAB node are wirelessly connected using NR to the IAB-donor, either directly or indirectly via another IAB node. The connection between IAB-donor/node and UEs is called access link, whereas the connection between two IAB nodes or between an IAB-donor and an IAB node is called backhaul link.

FIG. 3 illustrates an adjacent upstream node, which is closer to the IAB-donor node of an IAB node, that is referred to as a 'parent node' of the node (or a parent IAB node). As illustrated in FIG. 3, an adjacent downstream node, which is further away from the IAB-donor node of an IAB node, is referred to as a 'child node' of the IAB node. The backhaul link between the parent node and the IAB node is referred to as parent (backhaul) link, whereas the backhaul link between the IAB node and the child node is referred to as child (backhaul) link.

IAB Architecture

As one major difference of the IAB architecture compared to Rel-10 LTE relay (besides lower layer differences) is that the IAB architecture adopts the Central-Unit/Distributed-Unit (CU/DU) split of gNBs in which time-critical functionalities are realized in IAB-DU closer to the radio, whereas the less time-critical functionalities are pooled in the IAB-donor-CU with the opportunity for centralization. Based on this architecture, an IAB-donor contains both CU and DU functions. In particular, the IAB architecture contains all CU functions of the IAB nodes under the same IAB-donor. Each IAB node then hosts the DU function(s) of a gNB. In order to be able to transmit/receive wireless signals to/from the upstream IAB node or IAB-donor, each IAB node has a Mobile Termination (MT), which is a logical unit providing a necessary set of UE-like functions. Via the IAB-DU, the IAB node establishes RLC-channel to UEs and/or to MTs of the connected IAB node(s). Via the IAB-MT, the IAB node establishes the backhaul radio interface towards the serving IAB node or IAB-donor. FIG. 4 shows a reference diagram for a two-hop chain of IAB nodes under an IAB-donor. In particular, FIG. 4 illustrates that each of the IAB nodes comprises the IAB-DU and the IAB-MT.

IAB Topologies

Wireless backhaul links are vulnerable to blockage, e.g., due to moving objects such as vehicles, due to seasonal changes (foliage), severe weather conditions (rain, snow or hail), or due to infrastructure changes (new buildings). Such vulnerability also applies to IAB nodes. Also, traffic variations can create uneven load distribution on wireless backhaul links leading to local link or node congestion. In view of those concerns, the IAB topology supports redundant paths as another difference compared to the Rel-10 LTE relay.

FIG. 5 illustrates two examples of topologies considered in IAB: Spanning Tree (ST) and Direct Acyclic Graph (DAG). These two examples of topologies considered in the IAB show that one IAB node can have multiple child nodes and/or have multiple parent nodes. The multi-connectivity or route redundancy may be used for back-up purposes. It is also possible that redundant routes are used concurrently, e.g., to achieve load balancing, reliability, or other functionalities.

Resource Coordination

In case of in-band operation—which means that the access link and the backhaul link use same frequency spectrums—the IAB node is typically subject to the half-duplex constraint, i.e., an IAB node can only be in either transmission or reception mode at a time. Release 16 (Rel-16) IAB standards mainly consider the Time-Division Multiplexing (TDM) case where the MT and DU resources of the same IAB node are separated in time. Based on this consideration of the half-duplex of the TDM case, the following resource types have been defined in Rel-16 IAB for IAB-MT and IAB-DU, respectively.

From an IAB-MT point-of-view, as in Release (Rel-15) IAB standards, the following time-domain resources can be indicated for the parent link: Downlink (DL) time resource, Uplink (UL) time resource, and Flexible (F) time resource.

From an IAB-DU point-of-view, the child link has the following types of time resources: DL time resource, UL time resource, F time resource, and Not-available (NA) time resources (resources not to be used for communication on the DU child links).

Each of the DL, UL and F time-resource types of the DU child link can belong to one of two categories:

Hard (H): The corresponding time resource is always available for the DU child link.

Soft (S): The availability of the corresponding time resource for the DU child link is explicitly and/or implicitly controlled by the parent node.

The IAB-DU resources are configured per cell, and the H/S/NA attributes for the DU resource configuration are explicitly indicated per-resource type (D/U/F) in each slot. As a result, the semi-static time-domain resources of the DU part can be of seven types in total: Downlink-Hard (DL-H), Downlink-Soft (DL-S), Uplink-Hard (UL-H), Uplink-Soft (UL-S), Flexible-Hard (F-H), Flexible-Soft (F-S), and Not-Available (NA). The coordination relation between MT and DU resources are listed in Table 1 of FIG. 5A.

Furthermore, an IAB-DU function may correspond to multiple cells, including cells operating on different carrier frequencies. Similarly, an IAB-MT function may correspond to multiple carrier frequencies. This can either be implemented by one IAB-MT unit operating on multiple carrier frequencies, or be implemented by multiple IAB-MT units, each operating on different carrier frequencies. The H/S/NA attributes for the per-cell IAB-DU resource configuration and should take into account the associated IAB-MT carrier frequencies.

Resource Misalignment Between IAB-MT and IAB-DU

FIG. 6 illustrates three timing properties at the IAB node that cause timing misalignment between IAB-MT and IAB-DU resources:

$T_p$: the difference between the DL transmitting timing at the parent node (DU) and the DL receiving timing at the IAB node (MT). $T_p$ equals the parent-node-to-IAB node propagation time.

$T_A$: timing advance, i.e., difference between the UL transmitting timing and the DL receiving timing at the IAB node (MT).

$T_A$: deviation of the UL receiving timing from the DL transmitting timing at the IAB node (DU).

Timing misalignment between IAB-MT and IAB-DU resources caused by, but not limited to, the above three parameters and their determination and estimation makes it difficult to actually implement the desired coordination between the IAB-MT and the IAB-DU as listed in the Table 1 of FIG. 5A.

FIG. 7 illustrates an example of resource availability conflict due to propagation delay and receive timing advance. In this example, the slot k of IAB-DU resource is configured for DL Tx while the slot k of IAB-MT resource is configured for DL Rx, which are offset depending on the propagation delay and the DL Tx timing setting of the IAB node. If the slot k of IAB-DU resource is a Hard resource, the parent node should not schedule any transmission during the slot k to the MT. Since the slot k of IAB-MT resource in DL is delayed by the propagation delay, the slot (k−1) of IAB-MT resource may also be delayed by the propagation delay, which seems to be available for the parent node to schedule some transmission. If the parent node schedules DL Tx to the IAB-MT during the slot (k−1), the last part of the transmission may not be received by the IAB node since it is overlapped with the slot k of IAB-DU resource, which is a Hard resource and unavailable for the MT.

To avoid such resource conflict at the IAB node, RAN1 #98bis (R1-1911723, "RAN1 agreements for Rel-16 IAB," 3GPP TSG RAN WG1 Meeting #98bis, October 2019) has agreed that:

Start of Excerpt from RAN1 #98bis

A parent IAB node can be made aware of the number of symbols Ng the child IAB node would like the parent IAB node not to use at the edge (beginning or end) of a slot when there is a transition between child MT and child DU. Separately or additionally, the child IAB node can be made aware of the number of guard symbols that the parent IAB node will provide.

Ng can be provided for each of the 8 possible transitions with potential overlap: [a table in this position is reproduced in FIG. 7A]. If Ng is not provided it is assumed to be 0.

End of Excerpt from RAN1 #98bis

FIG. 8 illustrates the "8 possible transitions" (marked in dashed lines) disclosed in the table of RAN1 #98bis (reproduced in FIG. 8A). For example, the transition (1) of FIG. 8 indicates that, at the slot k−1, the IAB-MT of the IAB node performs DL Rx (Downlink Reception), and, at the slot k, the IAB-DU of the IAB node performs DL Tx (Downlink Transmission). Also, the transition (2) of FIG. 8 indicates the conflict situation illustrated in FIG. 7. That is, at the slot k−1, the IAB-MT the IAB node performs DL_RX and, at the slot k, a change of operation happens and thus the IAB-DU of the IAB node performs UL_RX. As illustrated in FIG. 7, some end symbols of the resource for the IAB-MT's DL_RX overlap with some start symbols of the resource for the IAB-DU's UL_RX due to propagation delay and other factors.

Further, RAN1 #99 (R1-1913600, "RAN1 agreements for Rel-16 IAB," 3GPP TSG RAN WG1 Meeting #99, November 2019) further agreed that:

Start of Excerpt from RAN1 #99

Desired Guard Symbols and Provided Guard Symbols are provided per cell and use 3 bits for each of the 8 transitions to indicate the number of guard symbols.

In Rel-16, a range of 0-4 symbols are supported for each transition. Additional entries are reserved for future use A new parameter GuardSymbol-SCS (Sub-Carrier Spacing) is also provided which indicates the reference SCS (FR1: {15 kHz, 30 kHz, 60 kHz}, FR2: {60 kHz, 120 kHz}) to be used for the guard symbols.

End of Excerpt from RAN1 #99

The guard symbols for IAB and the MAC CE are specified in 3GPP TS 38.321 ("NR; Medium Access Control (MAC) protocol specification"):

Start of Excerpt from TS 38.321

5.18.19 Guard symbols for IAB

For IAB operation, the MAC entity on the IAB-DU or IAB-donor-DU reserves a sufficient number of symbols at the beginning and/or the end of slots where the child IAB-node switches operation from its IAB-DU to its IAB-MT function and operation from its IAB-MT to its IAB-DU function. The MAC entity on the IAB-DU or IAB-donor-DU informs the child node about the number of guard symbols it provides via the Provided Guard Symbols MAC CE. The IAB-MT on the child node may inform the parent IAB-DU or IAB-donor-DU about the number of guard symbols desired via the Desired Guard Symbols MAC CE.

Upon reception of a Provided Guard Symbols MAC CE the MAC entity shall:

indicate to lower layers the number of provided guard symbols and the SCS configuration for the indicated Serving Cell.

The MAC entity may:

1> if a Desired Guard Symbol query has not been triggered:

2> trigger a Desired Guard Symbol query for this Serving Cell.

If the MAC entity has UL resources allocated for new transmission the MAC entity shall:

1> for each Desired Guard Symbol query that has been triggered and not cancelled:

2> if the allocated UL resources can accommodate a Desired Guard Symbols MAC CE plus its subheader as a result of LCP as defined in clause 5.4.3.1:

3> instruct the Multiplexing and Assembly procedure to generate the Desired Guard Symbols MAC CE;

3> cancel this Desired Guard Symbol query.

A separate value for the number of guard symbols is specified for each of the following eight switching scenarios (see Table 5.18.19-1). [The Table 5.18.19-1 is reproduced in FIG. 8A.]

6.1.3.22 Guard Symbols MAC CEs

The Guard Symbols MAC Ces (i.e. Provided Guard Symbols MAC CE and Desired Guard Symbols MAC CE) are identified by the MAC subheader with eLCID as specified in Table 6.2.1-1b for DL-SCH and in Table 6.2.1-2b for UL-SCH.

It has fixed size and consists of four octets defined as follows (FIG. 6.1.3.22-1):

R: Reserved bit, set to 0;

Serving Cell ID: This field indicates the identity of the Serving Cell for which the MAC CE applies. The length of the field is 5 bits;

Sub-carrier spacing (SCS): This field indicates the sub-carrier spacing used as reference for the guard spacing.

The length of this field is 2 bits. The values for the SCS field are shown in Table 6.1.3.22-2;

Number of Guard Symbols (NmbGS): This field indicates the number of guard symbols for the switching scenario shown in Table 5.18.19-1. The number of guard symbols can take values within the range of 0 . . . 4. Higher values 5-7 are reserved.

[FIG. 6.1.3.22-1 and Table 6.1.3.22-2 of 3GPP TS 38.321 are reproduced in FIG. 8B.]

End of Excerpt from TS 38.321

Timing Alignment

Different cases of transmission timing alignment across IAB nodes and IAB-donors have been considered in TR 38.874 ("3rd Generation Partnership Project Technical Specification Group Radio Access Network; NR Study on Integrated Access and Backhaul, Release 16"). TR 38.874 lists the following cases:

Start of Excerpt from TR 38.874

7.4 IAB-node synchronization and timing alignment

Case #1: DL transmission timing alignment across IAB-nodes and IAB-donors:

If DL TX and UL RX are not well aligned at the parent node, additional information about the alignment is needed for the child node to properly set its DL TX timing for OTA based timing & synchronization.

Case #2: DL and UL transmission timing is aligned within an IAB-node;

Case #3: DL and UL reception timing is aligned within an IAB-node;

Case #6 (Case #1 DL transmission timing+Case #2 UL transmission timing):

The DL transmission timing for all IAB-nodes is aligned with the parent IAB-node or donor DL timing;

The UL transmission timing of an IAB-node can be aligned with the IAB-node's DL transmission timing.

Case #7 (Case #1 DL transmission timing+Case #3 UL reception timing):

The DL transmission timing for all IAB-nodes is aligned with the parent IAB-node or donor DL timing;

The UL reception timing of an IAB-node can be aligned with the IAB-node's DL reception timing;

If DL TX and UL RX are not well aligned at the parent node, additional information about the alignment is needed for the child node to properly set its DL TX timing for OTA based timing & synchronization.

End of Excerpt from TR 38.874

That is, Case #1 is a timing alignment case in which DL transmission timing alignment across IAB nodes and IAB-donors is provided; Case #6 is a timing alignment case in which DL transmission timing alignment across IAB nodes and IAB-donors is provided and DL and UL transmission timing is aligned within an IAB node; and Case #7 is a timing alignment case in which DL transmission timing alignment across IAB nodes and IAB-donors is provided and DL and UL reception timing is aligned within an IAB node.

SUMMARY

Embodiments for reducing signaling overhead between an Integrated Access and Backhaul (IAB) node and its parent node when switching between timing alignment cases are disclosed in the present disclosure. In one embodiment, a method performed by an IAB node, comprises sending, to a parent IAB node, one or more sets of desired numbers of guard symbols for two or more timing switching groups, respectively, wherein each timing switching group of the two or more timing switching groups comprises one or more timing alignment cases. Each set of desired numbers of guard symbols comprises a desired number of guard symbols for the one or more timing alignment cases comprised in the respective timing switching group of the two or more timing switching groups. The method further comprises receiving, from the parent IAB node, one or more sets of provided numbers of guard symbols for the two or more timing switching groups, respectively, and determining available time resources for uplink transmission and/or downlink reception in two adjacent time units (e.g., slots) based on one of the one or more sets of provided numbers of guard symbols for one of the two or more timing switching that corresponds to timing alignment cases used in the two adjacent time units (e.g., slots). Thus, systems and methods disclosed herein reduce signaling overhead used for desired numbers of guard symbols and provided numbers of guard symbols when the IAB node switches between more than one timing-alignment case.

The IAB node comprises an IAB Mobile Termination (IAB-MT) and an IAB Distributed Unit (IAB-DU), and the desired numbers of guard symbols are numbers of symbols that the IAB-MT indicates to the parent IAB node not to use for the IAB-MT in slots where the IAB node transitions between the IAB-MT and the IAB-DU. The provided numbers of guard symbols are numbers of symbols that are not be used for the IAB-MT in slots where the IAB node transitions between the IAB-MT and the IAB-DU.

In one embodiment, the method further comprises performing uplink transmission and/or downlink reception in the two adjacent time units based on the determined available time resources.

In one embodiment, the one or more sets of desired numbers of guard symbols comprise a plurality of sets of desired numbers of guard symbols, the two or more timing switching groups comprise a plurality of timing switching groups, the one or more timing alignment cases comprise one or more of timing alignment cases for each of the two or more timing switching groups, and the one or more sets of provided numbers of guard symbols comprise a plurality of sets of provided numbers of guard symbols.

In one embodiment, the method further comprises changing a timing alignment configuration of the IAB node to a timing alignment configuration that corresponds to a particular timing alignment case of the plurality of timing alignment cases in a particular timing switching group of the plurality of timing switching groups and sending information to the parent IAB node that informs the parent IAB node of the changing of the timing alignment configuration of the IAB node.

In one embodiment, the method further comprises determining the available time resources for uplink transmission and/or downlink reception in the two adjacent time units comprises determining the available time resources for uplink transmission and/or downlink reception in the two adjacent time units based on one of the plurality of sets of provided numbers of guard symbols for the particular timing switching group that corresponds to the particular timing alignment case.

In one embodiment, the one or more sets of desired numbers of guard symbols consists of a single set of desired numbers of guard symbol, the two or more timing switching groups consist of a timing switching group, the one or more timing alignment cases comprise one or more of timing alignment cases for the timing switching group, and the one or more sets of provided numbers of guard symbols comprise a set of provided numbers of guard symbols.

In one embodiment, sending the one or more sets of desired numbers of guard symbols for two or more timing switching groups, respectively, comprises sending the set of desired numbers of guard symbols for the timing switching group to the parent IAB node responsive to a first occurrence of a corresponding change in a timing alignment configuration of the IAB node, and sending information to the parent JAB node that informs the parent IAB node of the changing of the timing alignment configuration of the IAB node.

In one embodiment, the two or more timing switching groups in the method comprise one or more of the following:

a first timing switching group comprising one or more of the following timing alignment cases:

Switching from IAB-MT Reception (Rx) in timing Case #1 to JAB-DU Transmission (Tx) in timing Case #1;

Switching from IAB-MT Rx in timing Case #1 to JAB-DU Rx in timing Case #1;

Switching from IAB-MT Tx in timing Case #1 to IAB-DU Tx in timing Case #1;

Switching from IAB-MT Tx in timing Case #1 to IAB-DU Rx in timing Case #1;

Switching from IAB-DU Rx in timing Case #1 to JAB-MT Tx in timing Case #1;

Switching from IAB-DU Rx in timing Case #1 to JAB-MT Rx in timing Case #1;

Switching from IAB-DU Tx in timing Case #1 to IAB-MT Tx in timing Case #1;

Switching from IAB-DU Tx in timing Case #1 to IAB-MT Rx in timing Case #1.

a second timing switching group comprising one or more of the following timing alignment cases:

Switching from IAB-MT Rx in timing Case #1 to JAB-DU Tx in timing Case #6;

Switching from IAB-MT Rx in timing Case #1 to JAB-DU Rx in timing Case #7;

Switching from IAB-MT Tx in timing Case #1 to IAB-DU Tx in timing Case #6;

Switching from IAB-MT Tx in timing Case #1 to IAB-DU Rx in timing Case #7;

Switching from IAB-DU Rx in timing Case #1 to IAB-MT Tx in timing Case #6;

Switching from IAB-DU Rx in timing Case #1 to IAB-MT Rx in timing Case #7;

Switching from IAB-DU Tx in timing Case #1 to IAB-MT Tx in timing Case #6;

Switching from IAB-DU Tx in timing Case #1 to IAB-MT Rx in timing Case #7;

a third timing switching group comprising one or more of the following timing alignment cases:

Switching from IAB-MT Rx in timing Case #7 to IAB-DU Tx in timing Case #1;

Switching from IAB-MT Rx in timing Case #7 to IAB-DU Rx in timing Case #1;

Switching from IAB-MT Tx in timing Case #6 to IAB-DU Tx in timing Case #1;

Switching from IAB-MT Tx in timing Case #6 to IAB-DU Rx in timing Case #1;

Switching from IAB-DU Rx in timing Case #7 to IAB-MT Tx in timing Case #1;

Switching from IAB-DU Rx in timing Case #7 to IAB-MT Rx in timing Case #1;

Switching from IAB-DU Tx in timing Case #6 to IAB-MT Tx in timing Case #1;

Switching from IAB-DU Tx in timing Case #6 to IAB-MT Rx in timing Case #1;

a fourth timing switching group comprising one or more of the following timing alignment cases:

Switching from IAB-MT Rx in timing Case #7 to IAB-DU Tx in timing Case #6;

Switching from IAB-MT Rx in timing Case #7 to IAB-DU Rx in timing Case #7;

Switching from IAB-MT Tx in timing Case #6 to IAB-DU Tx in timing Case #6;

Switching from IAB-MT Tx in timing Case #6 to IAB-DU Rx in timing Case #7;

Switching from IAB-DU Rx in timing Case #7 to IAB-MT Tx in timing Case #6;

Switching from IAB-DU Rx in timing Case #7 to IAB-MT Rx in timing Case #7;

Switching from IAB-DU Tx in timing Case #6 to IAB-MT Tx in timing Case #6;

Switching from IAB-DU Tx in timing Case #6 to IAB-MT Rx in timing Case #7.

Case #1 is a timing alignment case in which DL transmission timing alignment across IAB nodes and IAB-donors is provided; Case #6 is a timing alignment case in which DL transmission timing alignment across IAB nodes and IAB-donors is provided and DL and UL transmission timing is aligned within an IAB node; Case #7 is a timing alignment case in which DL transmission timing alignment across IAB nodes and IAB-donors is provided and DL and UL reception timing is aligned within an IAB node.

In one embodiment, the one or more timing alignment cases comprises one or more of the following:

Case #1 and Case #1;

Case #1 and Case #6;

Case #1 and Case #7;

Case #6 and Case #1;

Case #7 and Case #1;

Case #6 and Case #7;

Case #7 and Case #6;

Case #6 and Case #6; and

Case #7 and Case #7.

In one embodiment, the one or more timing alignment cases correspond to one or more of the following resource misalignments:

from IAB-MT Rx to IAB-DU Tx;

from IAB-MT Rx to IAB-DU Rx;

from IAB-MT Tx to IAB-DU Tx;

from IAB-MT Tx to IAB-DU Rx;

from IAB-DU Rx to IAB-MT Tx;

from IAB-DU Rx to IAB-MT Rx;

from IAB-DU Tx to IAB-MT Tx; and from IAB-DU Tx to IAB-MT Rx.

In one embodiment, sending the one or more sets of desired numbers of guard symbols for two or more timing switching groups, respectively, to the parent IAB node comprises sending the one or more sets of desired numbers of guard symbols for two or more timing switching groups, respectively, to the parent IAB node via one or more Medium Access Control (MAC) Control Elements (CEs).

In one embodiment, each MAC CE of the one or more MAC CEs comprises a reserved bit to indicate that one of the two or more timing switching groups is not Group-1.

In one embodiment, each MAC CE of the one or more MAC CEs comprises one or more of sub-carrier spacing, SCS, bits to indicate that the one or more sets of desired numbers of guard symbols correspond to one or more of Group-2, Group-3, or Group-4, respectively.

In one embodiment, receiving the one or more sets of provided numbers of guard symbols for the two or more timing switching groups, respectively, comprises receiving the one or more sets of provided numbers of guard symbols for the two or more timing switching groups, respectively, from the parent IAB node via one or more MAC CEs.

In one embodiment, each MAC CE of the one or more MAC CEs comprises one or more bits that indicate one of the two or more timing switching groups for which the MAC CE contains the respective set of provided numbers of guard symbols.

In one embodiment, sending the one or more sets of desired numbers of guard symbols for two or more timing switching groups, respectively, to the parent IAB node comprises sending at least one of the one or more sets of desired numbers of guard symbols as a difference relative to a reference set of desired numbers of guard symbols.

In one embodiment, receiving the one or more sets of provided numbers of guard symbols for the two or more timing switching groups, respectively, comprises receiving at least one of the one or more sets of provided numbers of guard symbols as a difference relative to a reference set of provided numbers of guard symbols.

In one embodiment, each of the timing switching groups of guard symbols additionally comprises:

switching from IAB-MT (DL) Rx in timing case A to IAB-DU Flexible (i.e., either Tx or Rx) in timing case B;

switching from IAB-MT (UL) Tx in timing case A to IAB-DU Flexible (i.e., either Tx or Rx) in timing case B;

switching from IAB-DU Flexible (i.e., either Tx or Rx) in timing case A to IAB-MT (DL) Rx in timing case B;

switching from IAB-DU Flexible (i.e., either Tx or Rx) in timing case A to IAB-MT (UL) Tx in timing case B, where timing case A and timing case B can be any of timing Case #1, timing Case #6, and timing Case #7.

In one embodiment, an IAB node is adapted to send, to a parent IAB node, one or more sets of desired numbers of guard symbols for two or more timing switching groups, respectively, wherein each timing switching group of the two or more timing switching groups comprises one or more timing alignment cases and each set of desired numbers of guard symbols comprises a desired number of guard symbols for the one or more timing alignment cases comprised in the respective timing switching group of the two or more timing switching groups. The IAB node is further adapted to receive, from the parent IAB node, one or more sets of provided numbers of guard symbols for the two or more timing switching groups, respectively, and determine available time resources for uplink transmission and/or downlink reception in two adjacent time units (e.g., slots) based on one of the one or more sets of provided numbers of guard symbols for one of the two or more timing switching groups that corresponds to timing alignment cases used in the two adjacent time units (e.g., slots).

In one embodiment, an IAB node comprises processing circuitry configured to cause the IAB node to send, to a parent IAB node, one or more sets of desired numbers of guard symbols for two or more timing switching groups, respectively, wherein each timing switching group of the two or more timing switching groups comprises one or more timing alignment cases; and each set of desired numbers of guard symbols comprises a desired number of guard symbols for the one or more timing alignment cases comprised in the respective timing switching group of the two or more timing switching groups. The processing circuitry is further configured to cause the IAB node to receive, from the parent IAB node, one or more sets of provided numbers of guard symbols for the two or more timing switching groups, respectively, and determine available time resources for uplink transmission and/or downlink reception in two adjacent time units (e.g., slots) based on one of the one or more sets of provided numbers of guard symbols for one of the two or more timing switching groups that corresponds to timing alignment cases used in the two adjacent time units (e.g., slots).

In one embodiment, a method performed by a parent IAB node comprises receiving, from an IAB node, one or more sets of desired numbers of guard symbols for two or more timing switching groups, respectively, wherein each timing switching group of the two or more timing switching groups comprises one or more timing alignment cases and each set of desired numbers of guard symbols comprises a desired number of guard symbols for the one or more timing alignment cases comprised in the respective timing switching group of the two or more timing switching groups. The method further comprises sending, to the IAB node, one or more sets of provided numbers of guard symbols for the two or more timing switching groups, respectively, and determining available time resources for uplink transmission and/or downlink reception in two adjacent time units (e.g., slots) based on one of the one or more sets of provided numbers of guard symbols for one of the two or more timing switching groups that corresponds to timing alignment cases used in the two adjacent time units (e.g., slots).

In one embodiment, the method further comprises receiving, from the IAB node, information that informs the parent IAB node of a change of a timing alignment configuration of the IAB node to a timing alignment configuration that corresponds to a particular timing alignment case of the plurality of timing alignment cases in a particular timing switching group of the plurality of timing switching groups.

In one embodiment, receiving the one or more sets of desired numbers of guard symbols for two or more timing switching groups, respectively, comprises receiving the set of desired numbers of guard symbols for the timing switching group from the IAB node responsive to a first occurrence of a corresponding change in a timing alignment configuration of the IAB node.

In one embodiment, receiving the one or more sets of desired numbers of guard symbols for two or more timing switching groups, respectively, from the IAB node comprises receiving the one or more sets of desired numbers of guard symbols for two or more timing switching groups, respectively, from the IAB node via one or more MAC CEs.

In one embodiment, sending the one or more sets of provided numbers of guard symbols for the two or more timing switching groups, respectively, comprises sending the one or more sets of provided numbers of guard symbols for the two or more timing switching groups, respectively, to the IAB node via one or more MAC CEs.

In one embodiment, receiving the one or more sets of desired numbers of guard symbols for two or more timing switching groups, respectively, from the IAB node comprises receiving at least one of the one or more sets of desired numbers of guard symbols as a difference relative to a reference set of desired numbers of guard symbols.

In one embodiment, sending the one or more sets of provided numbers of guard symbols for the two or more timing switching groups, respectively, comprises sending at least one of the one or more sets of provided numbers of guard symbols as a difference relative to a reference set of provided numbers of guard symbols.

In one embodiment, a parent IAB node adapted to receive, from a IAB node, one or more sets of desired numbers of guard symbols for two or more timing switching groups, respectively, wherein each timing switching group of the two or more timing switching groups comprises one or more timing alignment cases and each set of desired numbers of guard symbols comprises a desired number of guard symbols for the one or more timing alignment cases comprised in the respective timing switching group of the two or more timing switching groups. The parent IAB node is further adapted to send, to the IAB node, one or more sets of provided numbers of guard symbols for the two or more timing switching groups, respectively, and determine available time resources for uplink transmission and/or downlink reception in two adjacent time units (e.g., slots) based on one of the one or more sets of provided numbers of guard symbols for one of the two or more timing switching groups that corresponds to timing alignment cases used in the two adjacent time units (e.g., slots).

In one embodiment, a parent IAB node comprises processing circuitry configured to cause the parent IAB node to receive, from a IAB node, one or more sets of desired numbers of guard symbols for two or more timing switching groups, respectively, wherein each timing switching group of the two or more timing switching groups comprises one or more timing alignment cases and each set of desired numbers of guard symbols comprises a desired number of guard symbols for the one or more timing alignment cases comprised in the respective timing switching group of the two or more timing switching groups. The processing circuitry is further configured to cause the parent IAB node to send, to the IAB node, one or more sets of provided numbers of guard symbols for the two or more timing switching groups, respectively, and determine available time resources for uplink transmission and/or downlink reception in two adjacent time units (e.g., slots) based on one of the one or more sets of provided numbers of guard symbols for one of the two or more timing switching groups that corresponds to timing alignment cases used in the two adjacent time units (e.g., slots).

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5A illustrates the coordination relation between IAB Mobile Termination (IAB-MT) and IAB Distributed Unit (IAB-DU) resources.

FIG. 7A illustrates the eight possible transitions with potential overlap in RAN1 #98bis.

FIG. 8 illustrates the eight possible transitions disclosed in the table of RAN1 #98bis (reproduced in FIG. 8A).

FIG. 8A reproduces Table 5.18.19-1 of Third Generation Partnership Project (3GPP) Technical Specification (TS) 38.321.

FIG. 12 is a flow chart that illustrates another embodiment of a method of operations of the IAB node and the parent IAB node.

DETAILED DESCRIPTION

Figure 1:
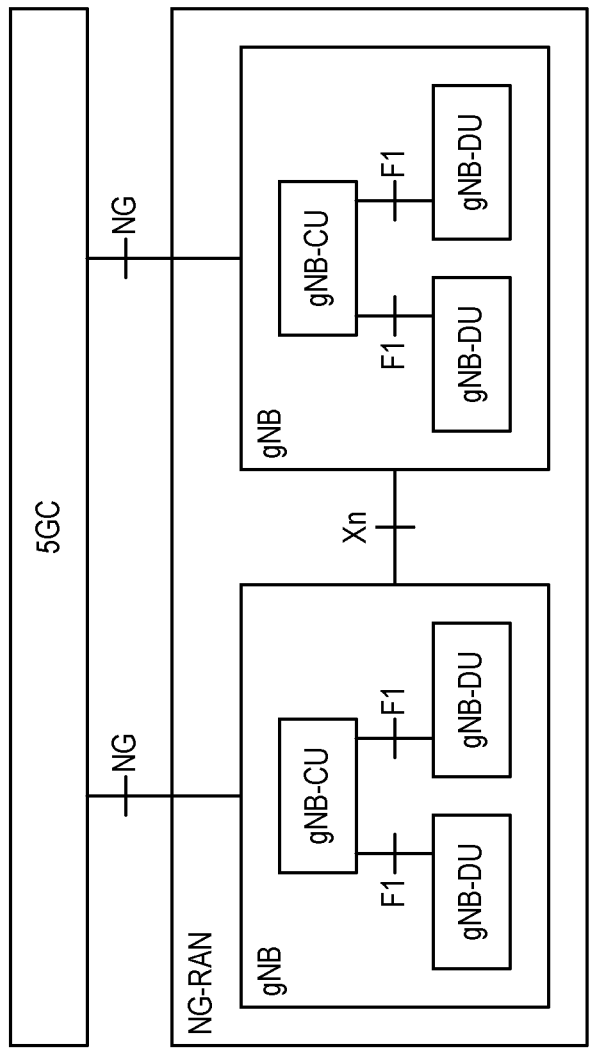
FIG. 1 illustrates the overall architecture of New Generation-Radio Access Network (NG-RAN) included in TS 38.401.
Figure 2:
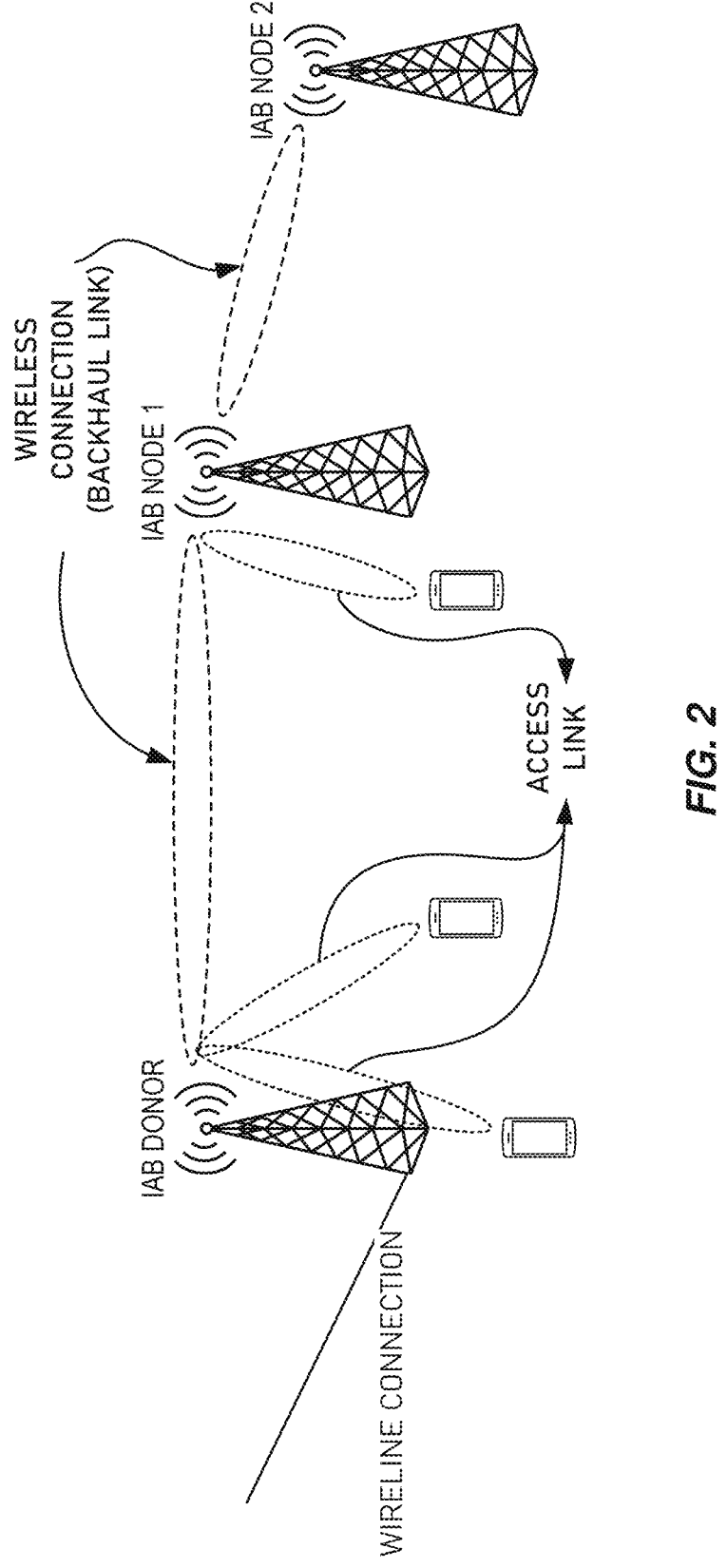
FIG. 2 illustrates an example of an Integrated Access Backhaul (IAB) deployment that supports multiple hops.
Figure 3:
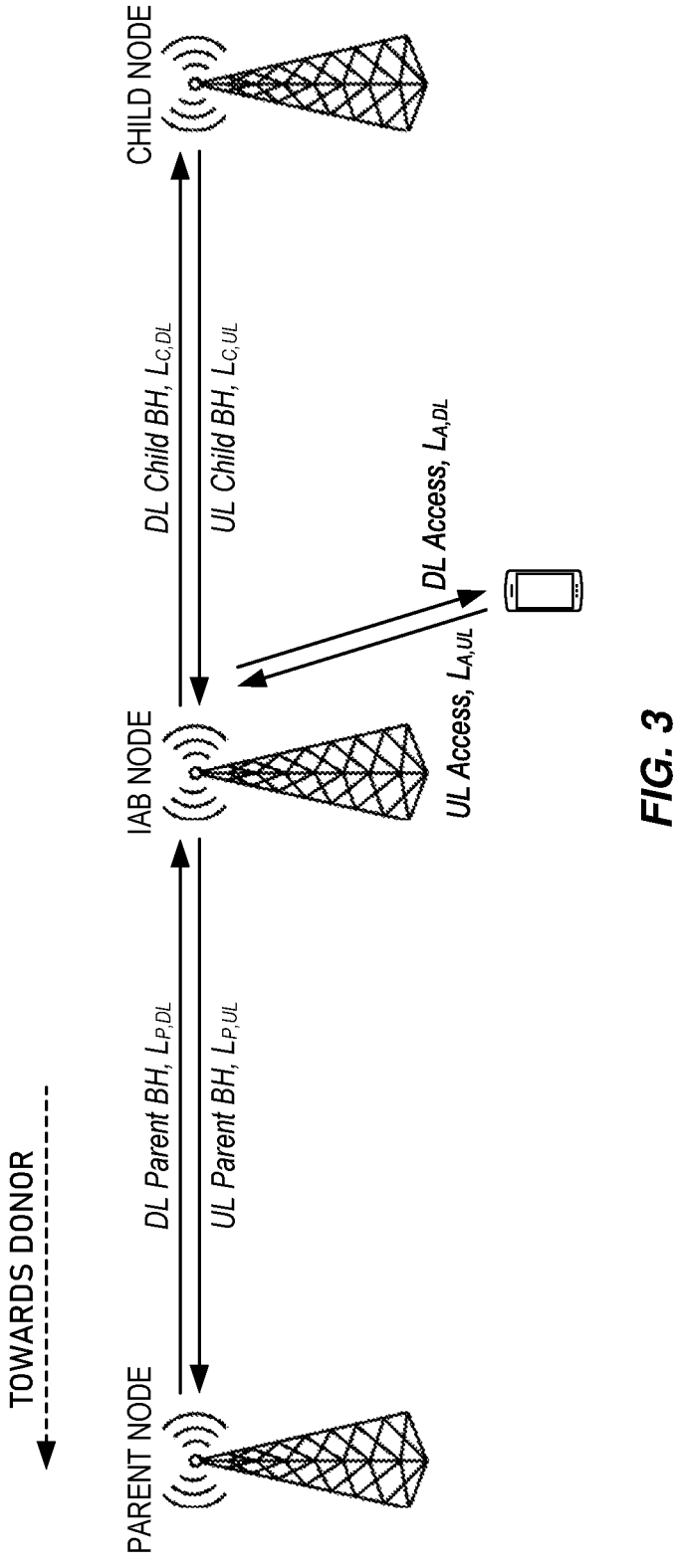
FIG. 3 illustrates a parent node, an IAB node, and a child node in NG-RAN.
Figure 4:
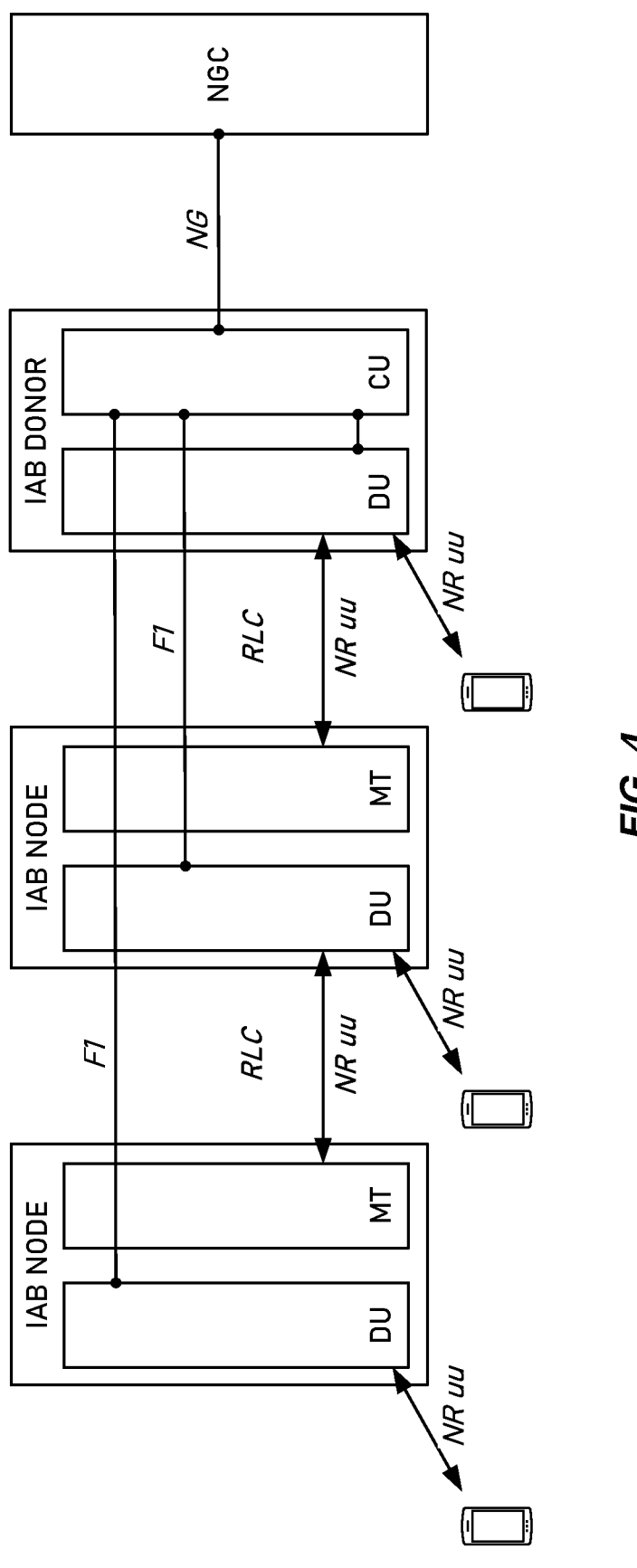
FIG. 4 illustrates a reference diagram for a two-hop chain of IAB nodes under an IAB-donor.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 9:
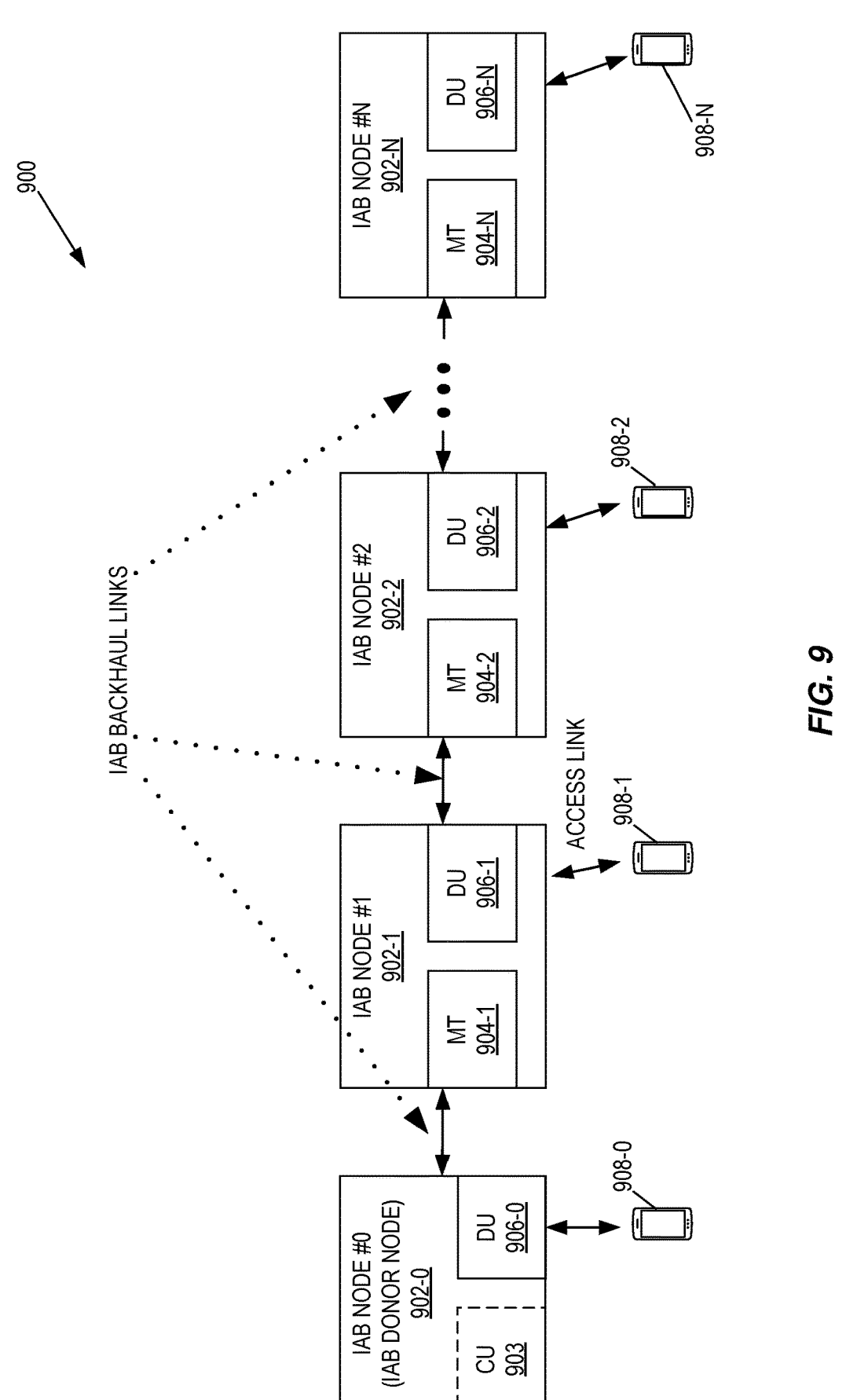
FIG. 9 illustrates one example of a radio access network (RAN) having an JAB architecture in which embodiments of the present disclosure may be implemented.

FIG. 9 illustrates one example of a radio access network (RAN) 900 having an Integrated Access and Backhaul (IAB) architecture in which embodiments of the present disclosure may be implemented. Note that optional features are represented by dashed lines/boxes. In the embodiments described herein, the RAN 900 is a Next Generation RAN (NG-RAN) (which is part of a 5G System (5GS) which includes the NG-RAN and a Fifth Generation Core (5GC)) or an Evolved Universal Terrestrial Radio Access Network (E-UTRAN) (which is part of an Evolved Packet System (EPS) which includes the E-UTRAN and an Evolved Packet Core (EPC)).

As will be appreciated by those of skill in the art, the RAN 900 includes a number of IAB nodes 902. Specifically, in this example, the IAB nodes 902 includes an IAB donor node 902-0 and one or more additional IAB nodes, which are referred to as IAB nodes 902-1 to 902-N. The IAB nodes 902-0 through 902-N are, in some embodiments, base stations (e.g., gNBs, ng-eNBs, or eNBs). The IAB donor node 902-0 preferably has a wired backhaul connection to the core network (not shown) and includes a CU 903, which is sometimes referred to herein as "IAB-donor-CU".

Figure 5:
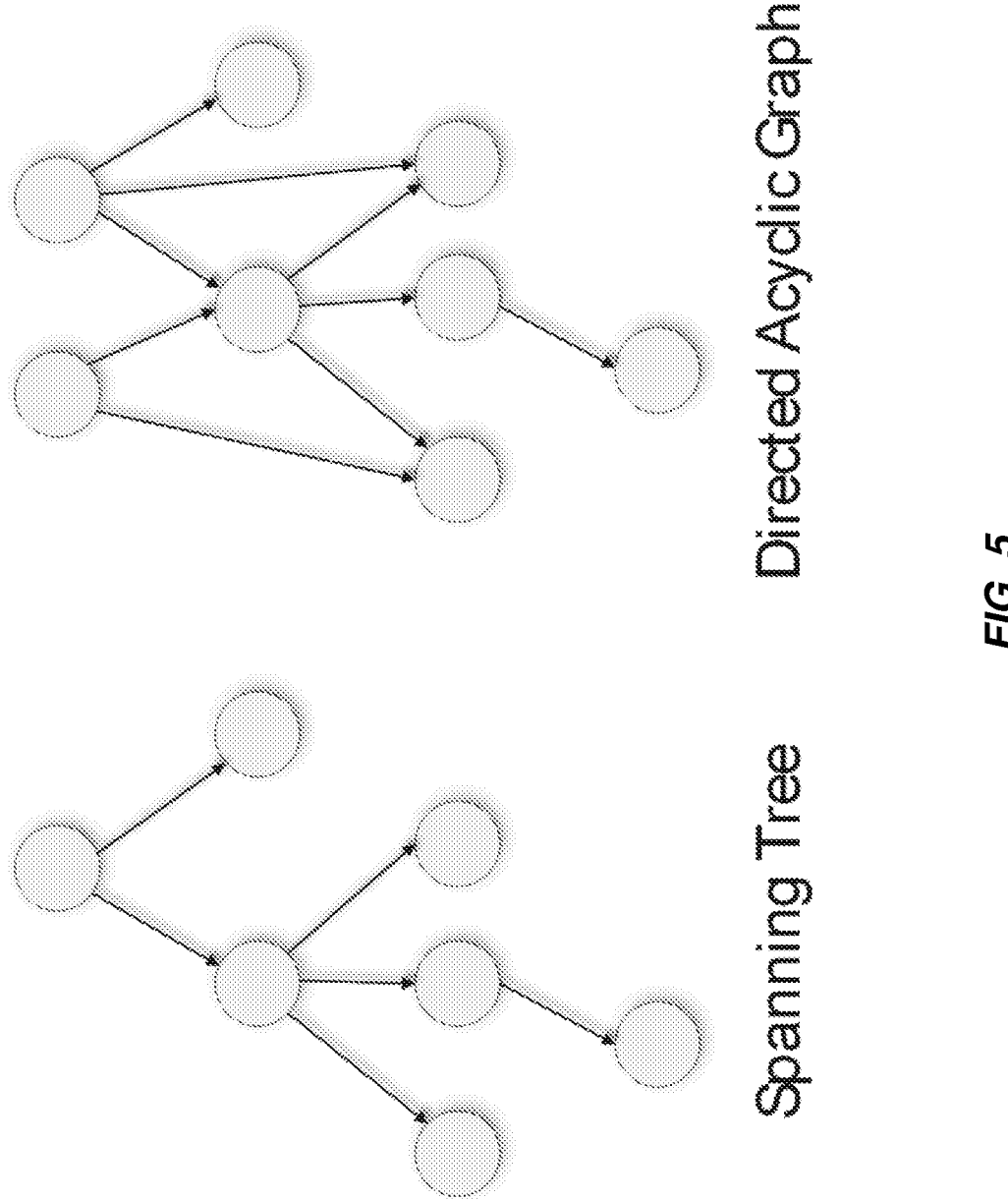
FIG. 5 illustrates two examples of topologies considered in IAB.

The IAB nodes 902-0 through 902-N include respective MTs 904-0 through 904-N and respective DUs 906-0 through 906-N. The MTs 904-1 through 904-N are sometimes referred to herein as IAB-MTs 904-1 through 904-N. Likewise, the DUs 906-0 through 906-N are sometimes referred to herein as IAB-DUs 906-0 through 906-N. The IAB nodes 902-0 through 902-N provide radio access to respective UEs 908-0 through 908-N. Note that only one UE 908 is illustrated for each of the IAB nodes 902-0 through 902-N for clarity, it should be appreciated that each of the IAB nodes 902-0 through 902-N may provide radio access to many UEs 908. Further, a single IAB node 902 may provide backhauling to multiple child IAB nodes. It should also be noted that the topology of IAB architecture illustrated in FIG. 9 is only an example. Other topologies may be used (see, e.g., the Spanning Tree (ST) topology and the Direct Acyclic Graph (DAG) topology illustrated in FIG. 5).

Note that, as used herein, an IAB node 902-i (also referred to herein as a "network IAB node") refers to an i-th IAB node, where "i" is any value in the range of 1 to N. The IAB node 902-p (e.g., wherein p=i−1 in the example of FIG. 9) is referred to as a "parent IAB node" of the IAB node 902-i, and the IAB node 902-c (e.g., wherein c=i+1 in the example of FIG. 9) is referred to as a "child IAB node" of the IAB node 902-i. Throughout this disclosure, 902-2 is used as an example of a reference number of an IAB node, and 902-1 is used as an example of a reference number of a parent node of that IAB node 902-2.

There currently exist certain challenge(s). Rel-16 IAB focuses on Case #1 timing where the IAB-MT 904 and the IAB-DU 906 operate in a Time-Division Multiplexing (TDM) manner. It is the basic context of the already-specified guard symbol signaling regarding IAB-MT 904 and IAB-DU 906 resource misalignments. One of the main objectives for the next release of IAB (Rel-17 IAB) is to specify enhancements for simultaneous transmission and/or reception at the IAB nodes. For simultaneous transmission, the IAB node 902-2 will operate in Case #6 timing. For simultaneous reception, the IAB node 902-2 will operate in Case #7 timing. Therefore, the IAB nodes 902 supporting Rel-17 IAB may need to frequently switch among three timing cases, namely, Case #1, Case #6, and Case #7, each of which leads to different guard symbols between the IAB-MT 904 and the IAB-DU 906 resources.

Every time when the timing alignment case changes, the IAB node 902-2 can send a new set of desired numbers of guard symbols to the parent node 902, and then the parent node 902 can respond with a new set of provided numbers of guard symbols. But exchanging the set of desired numbers of guard symbols and the set of provided numbers of guard symbols every time there are changes between the timing alignment cases may cause unnecessary signaling overhead and may cause unnecessary delays for the parent node's scheduling decision regarding the impacted resources at the IAB-MT 904.

Certain aspects of the present disclosure and their embodiments may provide solutions to the aforementioned or other challenges. Embodiments of the proposed solution extend the IAB network with the possibility to reduce unnecessary delays and overheads regarding frequent switching of timing alignment cases. Systems and methods are disclosed herein for reducing signaling overhead between an IAB node 902-2 and its parent node 902-1 when switching between timing alignment cases. In one embodiment, an IAB node 902-2 may send, to a parent IAB node 902-1, one or more sets of desired numbers of guard symbols for two or more timing switching groups, respectively, wherein each timing switching group of the two or more timing switching groups comprises one or more timing alignment cases and each set of desired numbers of guard symbols comprises a desired number of guard symbols for the one or more timing alignment cases comprised in the respective timing switching group of the two or more timing switching groups.

The IAB node 902-2 may receive, from the parent IAB node 902-1, one or more sets of provided numbers of guard symbols for the two or more timing switching groups, respectively. The IAB node 902-2 may determine available time resources for uplink transmission and/or downlink reception in two adjacent time units (e.g., slots) based on one of the one or more sets of provided numbers of guard symbols for one of the two or more timing switching groups that corresponds to timing alignment cases used in the two adjacent time units (e.g., slots).

When the IAB node 902-2 changes its operation mode and thereby uses a different timing-alignment case, it may implicitly or explicitly inform the parent IAB node 902-1 about the change. Both the IAB node 902-2 and the parent IAB node 902-1 change to use the corresponding sets of guard symbols.

Certain embodiments may provide one or more of the following technical advantage). Systems and methods disclosed herein reduce signaling overhead used for desired numbers of guard symbols and provided numbers of guard symbols when the IAB node 902-2 switches between more than one timing-alignment case. Since both the parent IAB node 902-1 and the IAB node 902-2 can do fast-switch to use corresponding sets of guard symbols according to timing-alignment cases performed at the IAB node, decision delay caused by guard symbol update can also be reduced.

Figure 10:
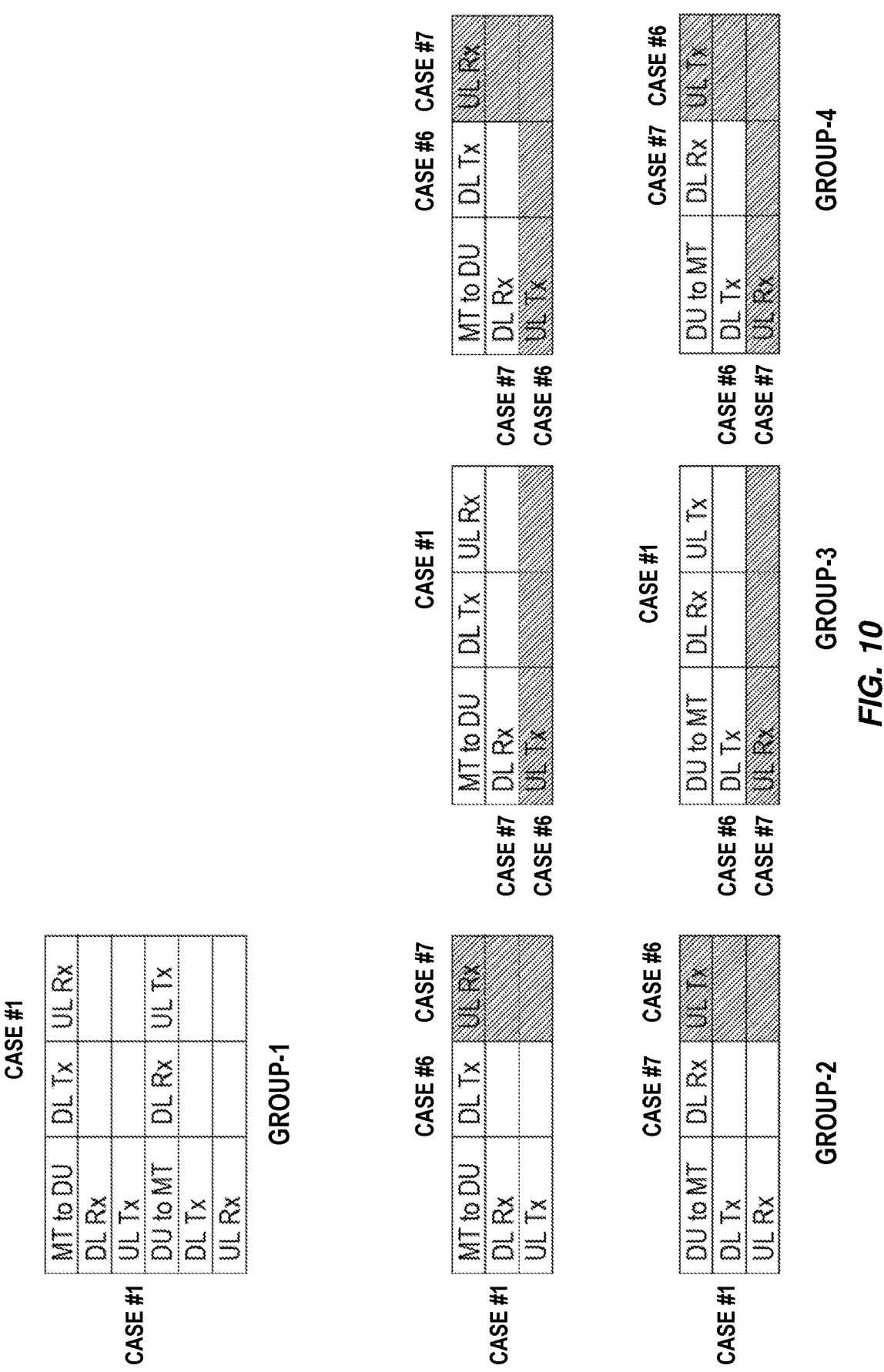
FIG. 10 illustrates a plurality of timing switching groups (Group-1, Group-2, Group-3, and Group-4) in accordance with some embodiments of the present disclosure.

Systems and methods are disclosed herein enable switching between different timing alignment cases with minimal overhead. In one embodiment, an IAB node 902-2 sends a plurality of sets of desired numbers of guard symbols to its parent IAB node 902-1. Each set of desired numbers of guard symbols corresponds to one of a plurality of timing switching groups, such as Group-1, Group-2, Group-3, and Group-4 that are shown in FIG. 10. Each group of the plurality of timing switching groups corresponds to one of multiple different combinations of timing alignment cases in two consecutive time units (e.g., slots) used for transmission/reception between the parent IAB node 902-1 and the IAB node 902-2 (i.e., between the IAB-MT 904-2 of the IAB node 902-2 and the IAB-DU 906-1 of the parent IAB node 902-1). For example, Group-2 (shown in FIG. 10) includes a set of at least eight desired numbers of guard symbols, which respectively correspond to eight different timing alignment cases between the IAB-MT 904-2 of the IAB node 902-2 and the IAB-DU 906-2 of the IAB node 902-2.

Figure 6:
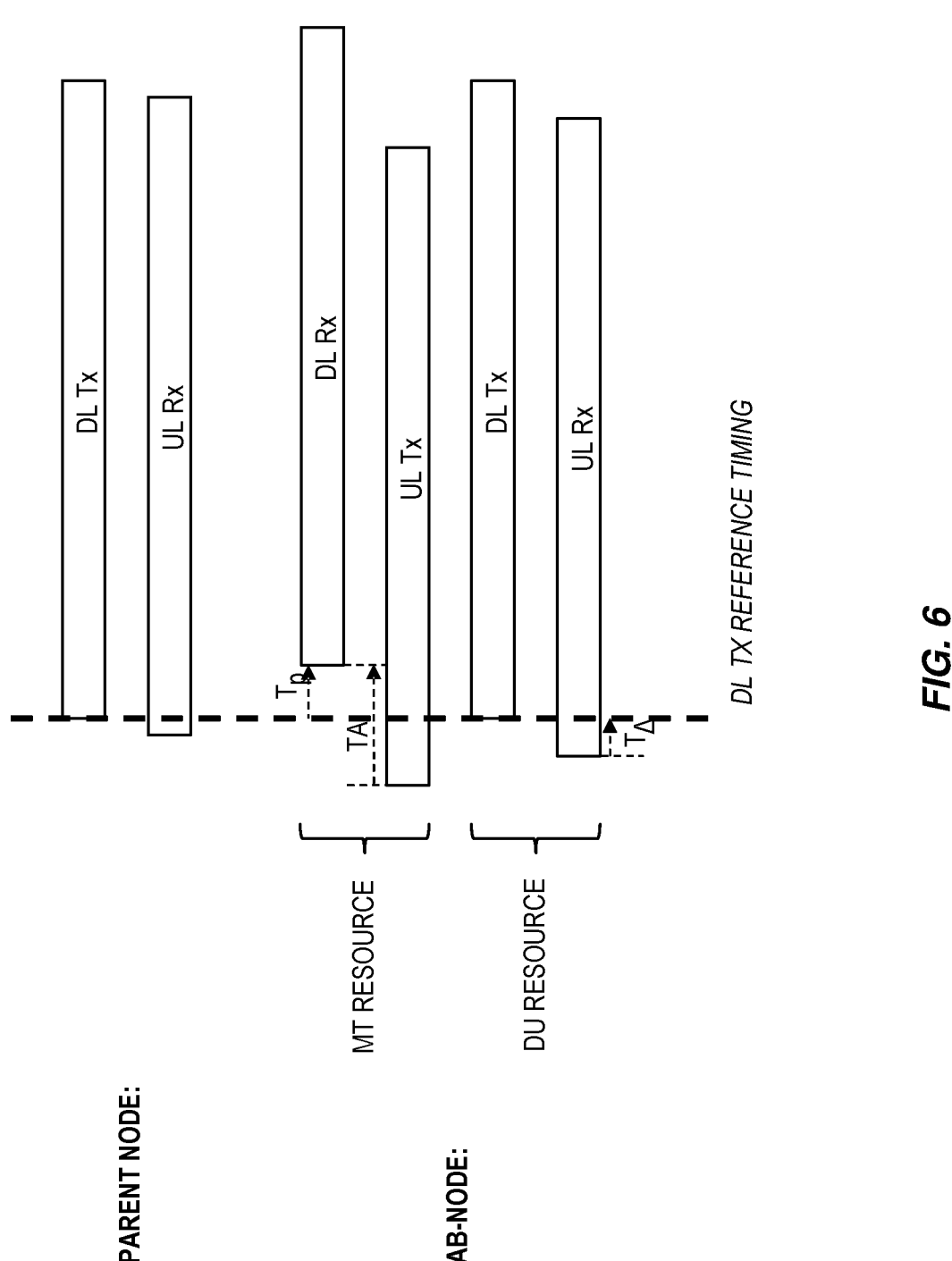
FIG. 6 illustrates three timing properties at the IAB node that cause timing misalignment between IAB-MT and IAB-DU resources.
Figure 7:
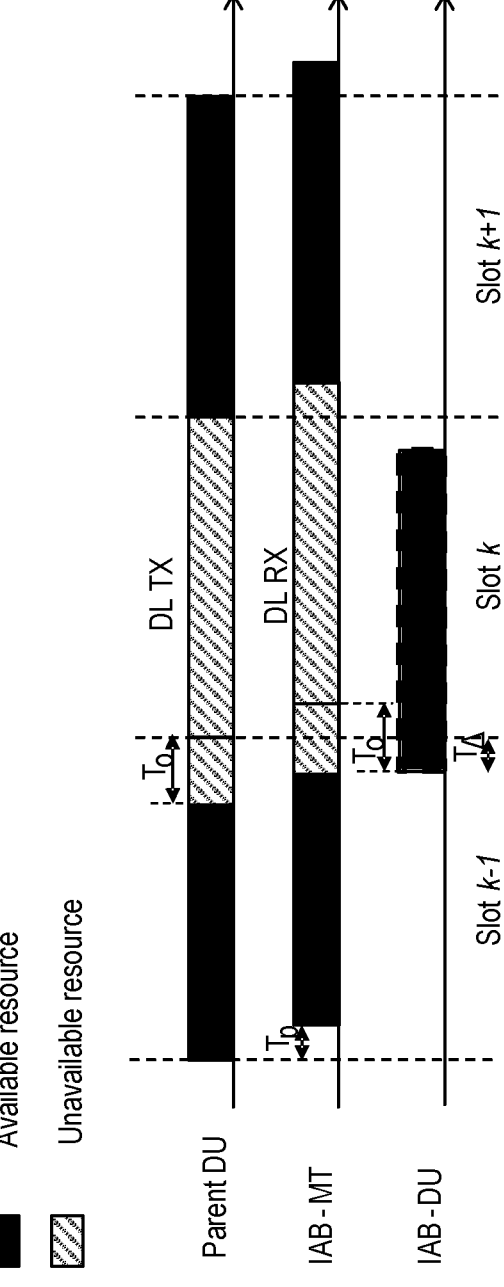
FIG. 7 an example of resource availability conflict due to propagation delay and receive timing advance.
Figure 8B:
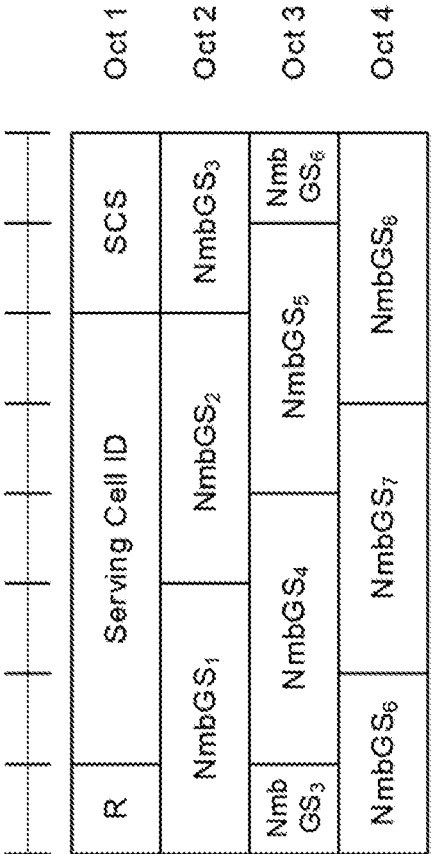
FIG. 8B reproduces FIG. 6.1.3.22-1 and Table 6.1.3.22-2 of 3GPP TS 38.321.

For example, each set of desired numbers of guard symbols may be provided in a Desired Guard Symbols Medium Access Control (MAC) Control Element (CE), such as or similar to those shown in Table 5.18.19-1 or FIG. 6.1.3.22-1 of TS 38.321 ("NR; Medium Access Control (MAC) protocol specification"): $NmbGS_1$, $NmbGS_2$, ..., and $NmbGS_8$ (reproduced in FIG. 8A and FIG. 8B).

In one embodiment, after the parent IAB node 902-1 receives the plurality of sets of desired numbers of guard symbols from the IAB node 902-2, the parent IAB node 902-1 stores the received plurality of sets of desired numbers of guard symbols (e.g., in a memory of the parent IAB node 902-1). In return, the parent IAB node 902-1 sends a plurality of sets of provided numbers of guard symbols to the IAB node 902-2 correspondingly. Similar to the desired numbers of guard symbols, each set of provided numbers of guard symbols corresponds to one of a plurality of timing switching groups, such as Group-1, Group-2, Group-3, and Group-4 shown in FIG. 10.

Each group of the plurality of timing switching groups contains a set of provided symbols of guard symbols corresponding to a plurality of different combinations of IAB-MT resource and IAB-DU resource. For example, each set of provided guard symbols may be included in a Provided Guard Symbols MAC CE such as or similar to that shown in Table 5.18.19-1 or FIG. 6.1.3.22-1 of TS 38.321 ("NR; Medium Access Control (MAC) protocol specification"): $NmbGS_1$, $NmbGS_2$, ..., and $NmbGS_8$. The IAB node 902-2 then stores the received plurality of sets of provided symbols of guard symbols (e.g., in a memory of the IAB node 902-2).

The guard symbols between IAB-MT and IAB-DU resources in the Rel-16 are for the case when both slot (k–1) and slot k operate in Case #1 timing alignment where IAB-MT and IAB-DU are in TDM mode, as shown in "Group-1" of FIG. 10. This set of 8 guard symbols is hereinafter referred to as Group-1 guard symbols.

Rel-17 IAB takes simultaneous transmission and reception into consideration. As a result, a IAB node 902-2 may operate in Case #1, Case #6 or Case #7 timing. When Case #6 timing alignment is used or implemented by the IAB node 902-2 or the parent IAB node 902-1, IAB-MT UL Tx timing is changed to be aligned with IAB-DU DL Tx timing. When Case #7 timing alignment is used, IAB-DU UL Rx timing is changed to be aligned with IAB-MT DL Rx timing. Accordingly, some of the desired numbers of guard symbols will change comparing to Group 1 guard symbols when the combinations of the timing-alignment cases in slot (k–1) and slot k are:

Case #1 and Case #6;
Case #1 and Case #7;
Case #6 and Case #1;
Case #7 and Case #1;
Case #6 and Case #7;
Case #7 and Case #6;
Case #6 and Case #6; and
Case #7 and Case #7.

The changes are summarized in FIG. 10 as "Group-2," "Group-3," and "Group-4." The shaded cells of the illustrated tables identify cells in the tables in which the number of guard symbols have different values from those in Group-1.

Although the values of the unshaded cells in FIG. 10 do not change from the resource misalignment perspective, the internal processing time in the IAB node 902-2 may change, since it comprises a change of transmission or reception mode, which is:

from Tx/Rx at either IAB-MT or IAB-DU to Tx/Rx at both IAB-MT and IAB-DU as in Group-2;
from Tx/Rx at both IAB-MT and IAB-DU to Tx/Rx at either IAB-MT or IAB-DU as in Group-3;
from simultaneous transmission to simultaneous reception, or vice versa as in Group-4;

Therefore, the desired numbers of guard symbols with respect to those cells may also change comparing to the values in Group-1.

In accordance with the present disclosure, there can be at least the following two exemplary embodiments for the IAB node 902-2 and the parent IAB node 902-1 to communicate the desired and provided numbers of guard symbols corresponding to different combinations of timing-alignment cases in two consecutive time units (e.g., slots).

First Embodiment

Figure 11:
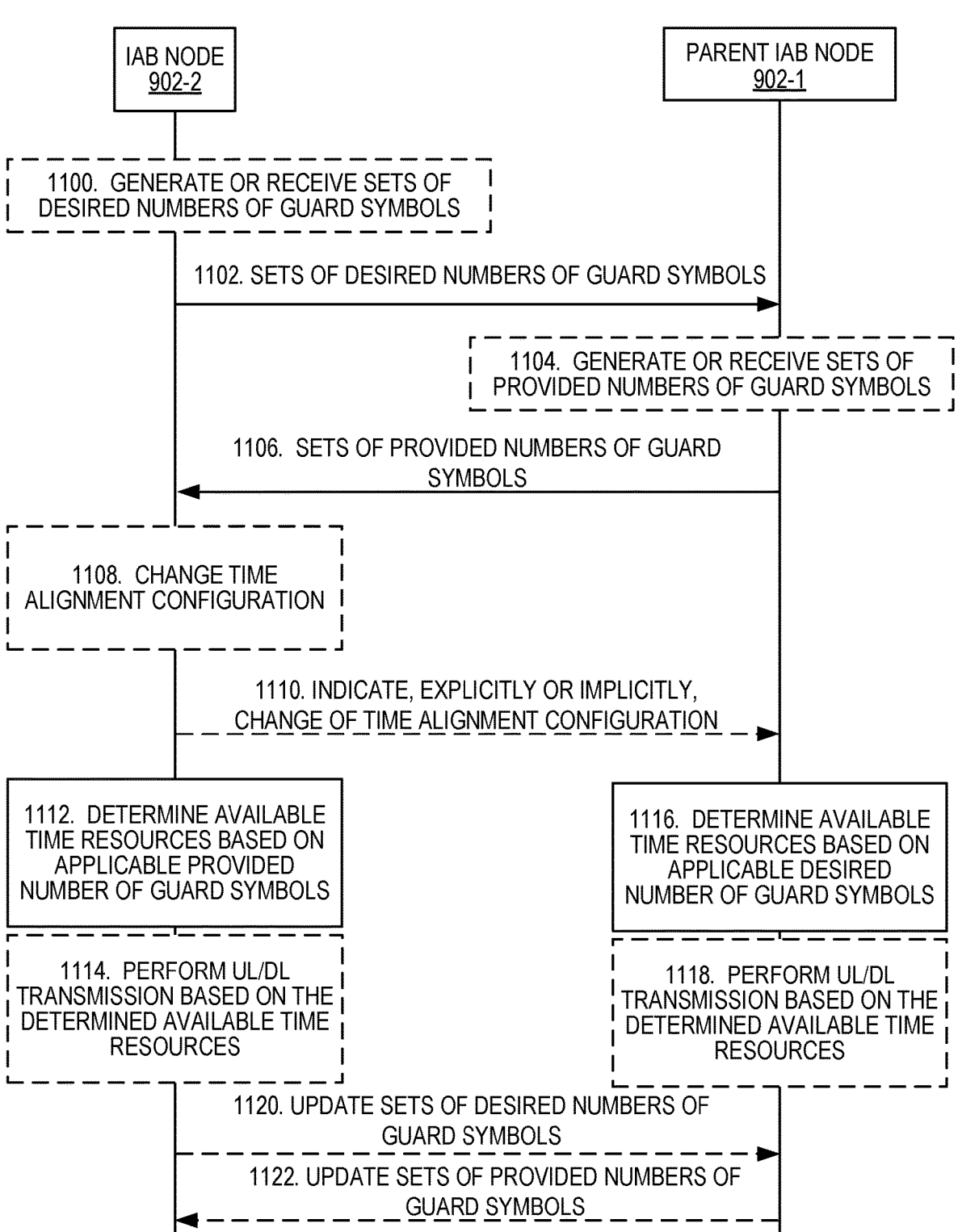
FIG. 11 a flow chart that illustrates one embodiment of a method of operations of the IAB node and the parent IAB node.

FIG. 11 is a flow chart that illustrates one embodiment of a method of operations of the IAB node 902-2 and the parent IAB node 902-1 (which can also be the donor-node 902-0). Optional steps are represented by dashed boxes.

Optionally, the IAB node 902-2 may generate one or more sets of desired numbers of guard symbols for two or more timing switching groups, respectively, wherein each timing switching group of the two or more timing switching groups comprises one or more timing alignment cases; and each set of desired numbers of guard symbols comprises a desired number of guard symbols for the one or more timing alignment cases comprised in the respective timing switching group of the two or more timing switching groups (step 1100). Alternatively, the IAB node 902-2 may receive the one or more sets of desired numbers of guard symbols from an external device or an operator (e.g., a user) of the IAB node 902-2 (step 1100).

An example of "a set of desired numbers of guard symbols" is the number of guard symbols included in a Desired Guard Symbol MAC CE disclosed in Technical Specification (TS) 38.321 ("NR; Medium Access Control (MAC) protocol specification"). The Desired Guard Symbol MAC CE includes a set of numbers of guard symbols that the IAB-MT 904-2 of the IAB node 902-2 indicates to the parent IAB node 902-1 not to use for the IAB-MT 904-2 of the IAB node 902-2 in slots where the IAB node 902-2 transitions between downlink reception/uplink transmission via the IAB-MT 904-2 and downlink transmission/uplink reception via the IAB-DU 906-2.

The IAB node 902-2 may send, to the parent IAB node 902-1, one or more sets of desired numbers of guard symbols for two or more timing switching groups, respectively (step 1102). Each timing switching group of the two or more timing switching groups comprises one or more timing alignment cases, and each set of desired numbers of guard symbols comprises a desired number of guard symbols for the one or more timing alignment cases comprised in the respective timing switching group of the two or more timing switching groups.

Optionally, sending the one or more sets of desired numbers of guard symbols for two or more timing switching groups, respectively, to the parent IAB node 902-1 comprises sending the one or more sets of desired numbers of guard symbols for two or more timing switching groups, respectively, to the parent IAB node 902-1 via one or more MAC CEs.

Optionally, sending the one or more sets of desired numbers of guard symbols for two or more timing switching groups, respectively, to the parent IAB node 902-1 comprises sending at least one of the one or more sets of desired numbers of guard symbols as a difference relative to a reference set of desired numbers of guard symbols.

Optionally, the parent IAB node 902-1 may generate a plurality of sets of provided numbers of guard symbols for the two or more timing switching groups, respectively (step 1104). Alternatively, the parent IAB node 902-1 may receive a plurality of sets of provided numbers of guard symbols from an external device or an operator (e.g., a user) of the parent IAB node 902-1 (step 1104).

An example of "a set of provided numbers of guard symbols" is the numbers of guard symbols included in a Provided Guard Symbol MAC CE as disclosed in TS 38.321 ("NR; Medium Access Control (MAC) protocol specification"). The Provided Guard Symbol MAC CE includes a set of numbers of symbols that are not be used for the IAB-MT 904-2 of the IAB node 902-2 in slots where the IAB node 902-2 transitions between downlink reception/uplink transmission via the IAB-MT 904-2 and downlink transmission/uplink reception via the IAB-DU 906-2, as stated in 3GPP TS 38.213, V16.3.0, Physical layer procedures for control ("For a serving cell of an IAB-MT, the IAB-MT can be provided by guard-SymbolsProvided a number of symbols that will not be used for the IAB-MT in slots where the IAB node transitions between IAB-MT and IAB node DU.").

The IAB node 902-2 may receive from the parent IAB node 902-1, the one or more sets of provided numbers of guard symbols for the two or more timing switching groups, respectively (step 1106).

Optionally, the IAB node 902-2 may receive the one or more sets of provided numbers of guard symbols for the two or more timing switching groups, respectively, from the parent IAB node 902-1 via one or more MAC CEs. Optionally, each MAC CE of the one or more MAC CEs comprises one or more bits that indicate one of the two or more timing switching groups for which the MAC CE contains the respective set of provided numbers of guard symbols (step 1106).

Optionally, the IAB node 902-2 may receive at least one of the one or more sets of provided numbers of guard symbols as a difference relative to a reference set of provided numbers of guard symbols (step 1106).

Optionally, the IAB node 902-2 may change a timing alignment configuration of the IAB node 902-2 to a timing alignment configuration that corresponds to a particular timing alignment case of the plurality of timing alignment cases in a particular timing switching group of the plurality of timing switching groups (step 1108), and indicate, to the parent IAB node 902-1, explicitly or implicitly, the change of the timing alignment configuration of the IAB node 902-2 (step 1110).

The IAB node 902-2 may determine available time resources for downlink transmission or uplink reception of the IAB-DU 906-2; and/or downlink reception or uplink transmission of the IAB-MT 904-2 in two adjacent time units (e.g., slots) based on one of the one or more sets of provided numbers of guard symbols for one of the two or more timing switching groups that corresponds to timing alignment cases used in the two adjacent time units (e.g., slots) (step 1112).

Optionally, the IAB node 902-2 may perform uplink transmission and/or downlink reception in the two adjacent time units based on the determined available time resources. For example, the IAB node 902-2 may not use time slots in edges (beginning or end) corresponding to the provided numbers of guard symbols when the IAB node 902-2 transitions between the IAB-MT 904-2 and the IAB-DU 906-2 (step 1114).

The parent IAB node 902-2 may determine available time resources for uplink transmission and/or downlink reception in two adjacent time units (e.g., slots) based on one of the one or more sets of desired numbers of guard symbols for one of the two or more timing switching groups that corresponds to timing alignment cases used in the two adjacent time units (e.g., slots) (step 1116).

Optionally, the parent IAB node 902-1 may perform uplink transmission and/or downlink reception in the two adjacent time units based on the determined available time resources. For example, the parent IAB node 902-1 may not use time slots in edges (beginning or end) corresponding to the desired numbers of guard symbols when the IAB node 902-2 performs a transition between the IAB-MT 904-2 and the IAB-DU 906-2 (1118).

Optionally, the IAB node 902-2 may send a signal of updating the sets of desired numbers of guard symbols to the parent IAB node 902-1 (step 1120). Optionally, the parent IAB node 902-1 may send a signal of updating the sets of provided numbers of guard symbols to the IAB node 902-2 (step 1122).

The switching or transition can be made from one slot (e.g., slot (k–1)) to the next slot (e.g., slot k). In one embodiment, each set of desired numbers of guard symbols per each timing switching group (Group-1 to Group-4) contains at least 8 non-negative values which represent the number of guard symbols corresponding to a plurality of timing alignment cases, as illustrated in FIG. 10:

Group-1:
Switching from IAB-MT Rx in timing Case #1 to JAB-DU Tx in timing Case #1;
Switching from IAB-MT Rx in timing Case #1 to JAB-DU Rx in timing Case #1;
Switching from IAB-MT Tx in timing Case #1 to IAB-DU Tx in timing Case #1;
Switching from IAB-MT Tx in timing Case #1 to IAB-DU Rx in timing Case #1;
Switching from JAB-DU Rx in timing Case #1 to JAB-MT Tx in timing Case #1;
Switching from IAB-DU Rx in timing Case #1 to IAB-MT Rx in timing Case #1;
Switching from IAB-DU Tx in timing Case #1 to IAB-MT Tx in timing Case #1;
Switching from IAB-DU Tx in timing Case #1 to IAB-MT Rx in timing Case #1.

Group-2:
Switching from IAB-MT Rx in timing Case #1 to IAB-DU Tx in timing Case #6;
Switching from IAB-MT Rx in timing Case #1 to IAB-DU Rx in timing Case #7;
Switching from IAB-MT Tx in timing Case #1 to IAB-DU Tx in timing Case #6;
Switching from IAB-MT Tx in timing Case #1 to IAB-DU Rx in timing Case #7;
Switching from IAB-DU Rx in timing Case #1 to IAB-MT Tx in timing Case #6;
Switching from IAB-DU Rx in timing Case #1 to IAB-MT Rx in timing Case #7;
Switching from IAB-DU Tx in timing Case #1 to IAB-MT Tx in timing Case #6;
Switching from IAB-DU Tx in timing Case #1 to IAB-MT Rx in timing Case #7.

Group-3:

Switching from IAB-MT Rx in timing Case #7 to IAB-DU Tx in timing Case #1;

Switching from IAB-MT Rx in timing Case #7 to IAB-DU Rx in timing Case #1;

Switching from IAB-MT Tx in timing Case #6 to IAB-DU Tx in timing Case #1;

Switching from IAB-MT Tx in timing Case #6 to IAB-DU Rx in timing Case #1;

Switching from IAB-DU Rx in timing Case #7 to IAB-MT Tx in timing Case #1;

Switching from IAB-DU Rx in timing Case #7 to IAB-MT Rx in timing Case #1;

Switching from IAB-DU Tx in timing Case #6 to IAB-MT Tx in timing Case #1;

Switching from IAB-DU Tx in timing Case #6 to IAB-MT Rx in timing Case #1.

Group-4:

Switching from IAB-MT Rx in timing Case #7 to IAB-DU Tx in timing Case #6;

Switching from IAB-MT Rx in timing Case #7 to IAB-DU Rx in timing Case #7;

Switching from IAB-MT Tx in timing Case #6 to IAB-DU Tx in timing Case #6;

Switching from IAB-MT Tx in timing Case #6 to IAB-DU Rx in timing Case #7;

Switching from IAB-DU Rx in timing Case #7 to IAB-MT Tx in timing Case #6;

Switching from IAB-DU Rx in timing Case #7 to IAB-MT Rx in timing Case #7;

Switching from IAB-DU Tx in timing Case #6 to IAB-MT Tx in timing Case #6;

Switching from IAB-DU Tx in timing Case #6 to IAB-MT Rx in timing Case #7.

Optionally, the parent IAB node 902-1 may control a change of a time mode operation at the IAB node 902-2, for example, by sending a controlling signal to the IAB node 902-2. Based on the controlling signal sent by the parent IAB node 902-1, the IAB node 902-2 may change a time mode operation that corresponds to one of the time alignment cases, for example, from Case #1 at the slot (k–1) to Case #6 at the slot k.

When the IAB node 902-2 changes the timing mode operation in which it will operate in, the IAB node 902-2 may implicitly or explicitly inform the parent IAB node 902-1 about the change of the timing mode operation. In RAN1. Chairman's Notes ("RAN1. Chairman's Notes," 3GPP TSG RAN WG1 Meeting #103e, November 2020), it has been agreed that the control of Case #6 timing mode operation at a IAB node 902-2 is by the parent IAB node 902-1 to which the UL transmission is intended for.

Start of Excerpt from RAN1. Chairman's Notes

Agreement

Case 6 timing mode operation at an IAB-node is controlled by the parent IAB node to which the UL transmission is intended for.

End of Excerpt from RAN1. Chairman's Notes

Therefore, the parent IAB node 902-1 will implicitly know when the IAB node 902-2 will start or stop operating in case of Case #6 timing mode operation. That is, the IAB node 902-2 does not need to inform the parent IAB node 902-1 of timing mode operation changes from Case #6 to Case #1 or to Case #7. In other cases, the IAB node 902-2 may explicitly inform the parent IAB node 902-1 when it will (i) change from Case #1 or Case #6 timing to Case #7 timing or (ii) change from Case #7 timing to Case #1 timing by sending a signal to the parent IAB node 902-1.

For example, if the IAB node 902-2 changes the timing mode operation from Case #6 at slot (k–1) to Case #1 or Case #7 at slot k, the IAB node 902-2 may not need to inform the parent IAB node 902-1 of the change of the timing mode operation, because the change from Case #6 to those other cases (Case #1, Case #7) may be initiated or controlled by the parent IAB node 902-1, thus the parent IAB node 902-1 already knows the change of the timing mode operation at the IAB node 902-2.

Second Embodiment

FIG. 12 is a flow chart that illustrates another embodiment of a method of operations of the IAB node 902-2 and the parent IAB node 902-1. Optional steps are represented by dashed boxes.

Optionally, the IAB node 902-2 may generate one or more sets of desired numbers of guard symbols (step 1200). Alternatively, the IAB node 902-2 may receive one or more sets of desired numbers of guard symbols from an external device or an operator (e.g., a user) of the IAB node 902-2 (step 1200).

Optionally, the IAB node 902-2 may determine that a timing configuration that corresponds to a first occurrence of one of the timing alignment cases for a particular timing switching group has occurred (step 1202). The first occurrence is that of one of the following time alignment cases:

Case #1 and Case #1;

Case #1 and Case #6;

Case #1 and Case #7;

Case #6 and Case #1;

Case #7 and Case #1;

Case #6 and Case #7;

Case #7 and Case #6;

Case #6 and Case #6; and

Case #7 and Case #7.

The timing switching groups comprise resource misalignments occurred in the timing alignment cases:

from IAB-MT Rx to IAB-DU Tx;

from IAB-MT Rx to IAB-DU Rx;

from IAB-MT Tx to IAB-DU Tx;

from IAB-MT Tx to IAB-DU Rx;

from IAB-DU Rx to IAB-MT Tx;

from IAB-DU Rx to IAB-MT Rx;

from IAB-DU Tx to IAB-MT Tx; and from IAB-DU Tx to IAB-MT Rx.

The IAB node 902-2 may send, to a parent IAB node 902-1, a single set of desired numbers of guard symbols for two or more timing switching groups for the first occurrence wherein: each timing switching group of the two or more timing switching groups comprises one or more timing alignment cases; and the single set of desired numbers of guard symbols comprises a desired number of guard symbols for the one or more timing alignment cases comprised in the respective timing switching group of the two or more timing switching groups (step 1204).

Optionally, the IAB node 902-2 may send the single set of desired numbers of guard symbols for two or more timing switching groups, respectively, to the parent IAB node 902-1 via one or more MAC CEs.

Optionally, the IAB node 902-2 may send the single set of desired numbers of guard symbols as a difference relative to a reference set of desired numbers of guard symbols.

Optionally, the parent IAB node 902-1 may generate one or more sets of provided numbers of guard symbols, for example, Provided Guard Symbols disclosed in relevant standards, such as Technical Specification (TS) 38.321, NR;

Medium Access Control (MAC) protocol specification (e.g., 5.18.19 Guard Symbols for IAB) (step 1206). Alternatively, the parent IAB node 902-1 may receive one or more sets of provided numbers of guard symbols from an external device or an operator (e.g., a user) of the parent IAB node 902-1 (step 1206).

The IAB node 902-2 may receive, from the parent IAB node 902-1, a single set of provided numbers of guard symbols for the two or more timing switching groups, respectively (step 1208).

Optionally, the IAB node 902-2 may receive the single set of provided numbers of guard symbols for the two or more timing switching groups, respectively, from the parent IAB node 902-1 via one or more MAC CEs.

Optionally, each MAC CE of the one or more MAC CEs may comprise one or more bits that indicate one of the two or more timing switching groups for which the MAC CE contains the respective set of provided numbers of guard symbols.

Optionally, the IAB node 902-2 may receive of the single set of provided numbers of guard symbols as a difference relative to a reference set of provided numbers of guard symbols.

The IAB node 902-2 may determine available time resources for uplink transmission and/or downlink reception in two adjacent time units (e.g., slots) based on the single set of provided numbers of guard symbols for one of the two or more timing switching groups that corresponds to timing alignment cases used in the two adjacent time units (e.g., slots) (step 1210).

Optionally, the IAB node 902-2 may perform uplink transmission and/or downlink reception in the two adjacent time units based on the determined available time resources. For example, the IAB node 902-2 may not use time slots in edges (beginning or end) corresponding to the provided numbers of guard symbols when the IAB node 902-2 performs a transition between the IAB-MT 904-2 and the IAB-DU 906-2 (step 1212).

The parent IAB node 902-1 may determine available time resources for uplink transmission and/or downlink reception in two adjacent time units (e.g., slots) based on the single set of desired numbers of guard symbols for one of the two or more timing switching groups that corresponds to timing alignment cases used in the two adjacent time units (e.g., slots) (step 1214).

Optionally, the parent IAB node 902-1 may perform uplink transmission and/or downlink reception in the two adjacent time units based on the determined available time resources. For example, the parent IAB node 902-1 may not use time slots in edges (beginning or end) corresponding to the desired numbers of guard symbols when the IAB node 902-2 performs a transition between the IAB-MT 904-2 and the IAB-DU 906-2 (step 1216).

Other Embodiments

As disclosed in TS 38.321 ("NR; Medium Access Control (MAC) protocol specification"), the Guard Symbols MAC CE comprises a reserved field and a field to indicate a reference Sub-Carrier Spacing (SCS) for the guard spacing. Instead of specifying additional signaling to inform the parent IAB node 902-1 or the IAB node 902-2 about the number of guard symbols in the different Group-2, Group-3 and Group-4, the reserved bit can be used to indicate the signaling of guard symbol combinations is for one of Group-2, Group-3 or Group-4, and not Group-1. In this case, one can further assume the SCS field is the same SCS as for the Case #1 guard symbols configuration (Group-1) and instead use the 2 bits from the SCS field to flag a Group-2, Group-3 or Group-4 guard symbols combination.

In another embodiment, the guard symbol combinations are with reference to the Case #1 guard symbol combination (i.e., Group-1). For example, it could only the difference to Case #1 guard symbols in Group-1 be signaled for Group-2, Group-3 and Group-4 guard symbols combinations.

In another embodiment, the parent IAB node 902-1 and the IAB node 902-2 may use a predefined or higher-layer (e.g., F1-AP or Radio Resource Control (RRC)) configured method to decide on the effective number of guard symbols if a certain IAB-DU resource in question is configured as Flexible (i.e., IAB-DU will either transmit or receive) based on the received guard symbols associated with IAB-DU Tx and/or IAB-DU Rx.

In another embodiment, each group of guard symbols (e.g., when the number of guard symbols is more than 8 values) additionally considering:

switching from IAB-MT (DL) Rx in timing case A to IAB-DU Flexible (i.e., either Tx or Rx) in timing case B;

switching from IAB-MT (UL) Tx in timing case A to IAB-DU Flexible (i.e., either Tx or Rx) in timing case B;

switching from IAB-DU Flexible (i.e., either Tx or Rx) in timing case A to IAB-MT (DL) Rx in timing case B;

switching from IAB-DU Flexible (i.e., either Tx or Rx) in timing case A to IAB-MT (UL) Tx in timing case B, where timing case A and timing case B can be any of timing Case #1, timing Case #6, and timing Case #7.

Additional Description

Figure 13:
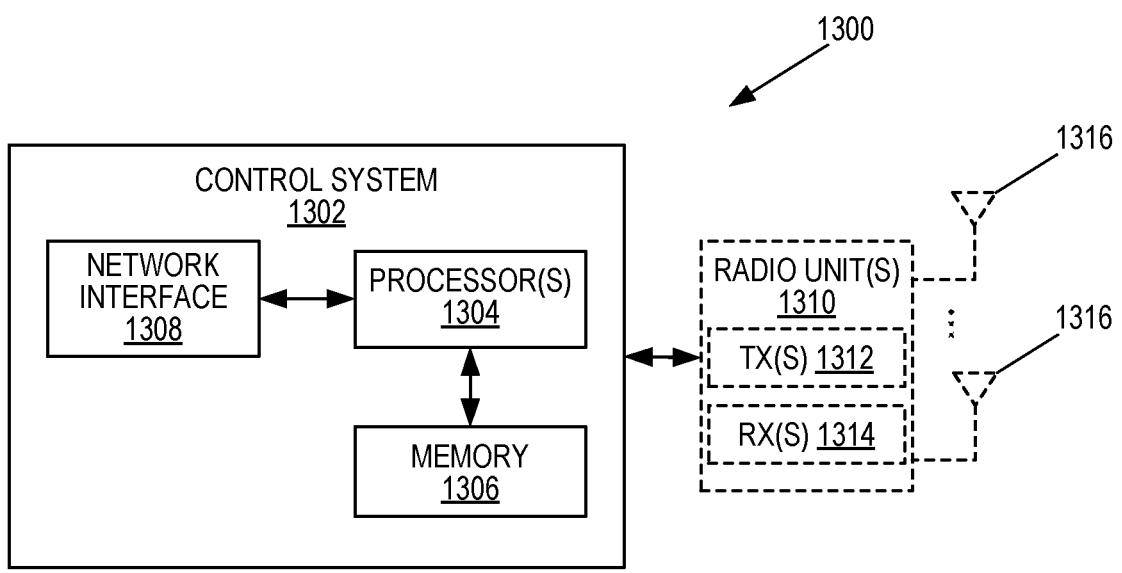
FIG. 13 is a schematic block diagram of a radio access node according to some embodiments of the present disclosure.

FIG. 13 is a schematic block diagram of a radio access node 1300 according to some embodiments of the present disclosure. Optional features are represented by dashed boxes. The radio access node 1300 may be, for example, a base station 902 or 906 or a network node that implements all or part of the functionality of the base station 902 or gNB described herein. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 may include one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein. In some embodiments, the function(s) are implemented in software that is stored, e.g., in the memory 1306 and executed by the one or more processors 1304.

For the proposed solution, embodiments of a method of operation of the IAB node 902-2 and the parent IAB node 902-1 are disclosed. The IAB node 902-2 and the parent IAB node 902-1 are examples of the radio access node 1320.

Thus, the IAB node 902-2 and the parent IAB node 902-1 comprise all the components shown in the radio access node 1320 of FIG. 13.

Figure 15:
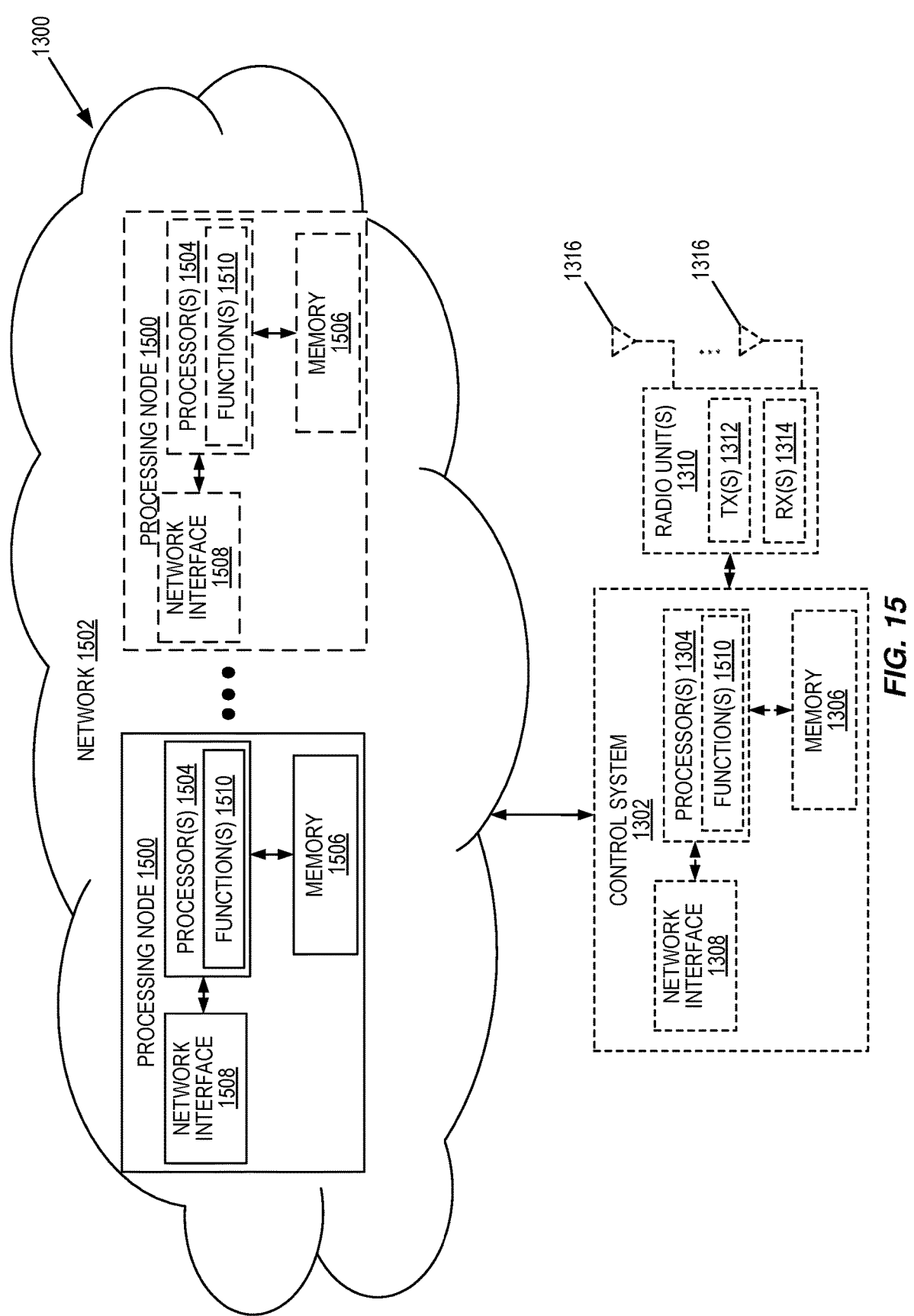
FIG. 15 is a schematic block diagram that illustrates a virtualized embodiment of the radio access node according to some embodiments of the present disclosure.

FIG. 15 is a schematic block diagram that illustrates a virtualized embodiment of the radio access node 1300 according to some embodiments of the present disclosure. This discussion is equally applicable to other types of network nodes. Further, other types of network nodes may have similar virtualized architectures. Again, optional features are represented by dashed boxes. The IAB node 902-2 and the parent IAB node 902-1 are examples of the radio access node 1320 illustrated in FIG. 15.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 may include the control system 1302 and/or the one or more radio units 1310, as described above. The control system 1302 may be connected to the radio unit(s) 1310 via, for example, an optical cable or the like. The radio access node 1300 includes one or more processing nodes 1500 coupled to or included as part of a network(s) 1502. If present, the control system 1302 or the radio unit(s) are connected to the processing node(s) 1500 via the network 1502. Each processing node 1500 includes one or more processors 1504 (e.g., CPUs, ASICs, FPGAs, and/or the like), memory 1506, and a network interface 1508.

In this example, functions 1510 of the radio access node 1300 described herein are implemented at the one or more processing nodes 1500 or distributed across the one or more processing nodes 1500 and the control system 1302 and/or the radio unit(s) 1310 in any desired manner. In some particular embodiments, some or all of the functions 1510 of the radio access node 1300 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1302 is used in order to carry out at least some of the desired functions 1510. Notably, in some embodiments, the control system 1302 may not be included, in which case the radio unit(s) 1310 communicate directly with the processing node(s) 1500 via an appropriate network interface(s).

In some embodiments, a computer program including instructions which, when executed by at least one processor, causes the at least one processor to carry out the functionality of radio access node 1300 or a node (e.g., a processing node 1500) implementing one or more of the functions 1510 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
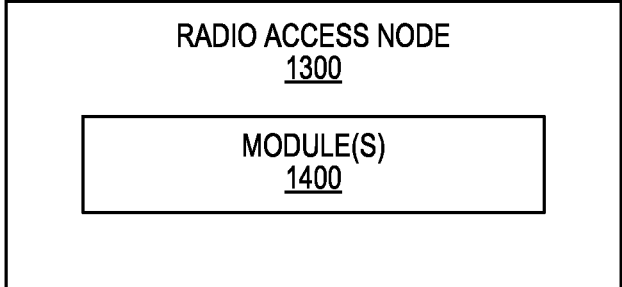
FIG. 14 a schematic block diagram of the radio access node according to some other embodiments of the present disclosure.

FIG. 14 is a schematic block diagram of the radio access node 1300 according to some other embodiments of the present disclosure. The radio access node 1300 includes one or more modules 1400, each of which is implemented in software. The module(s) 1400 provide the functionality of the radio access node 1300 described herein. This discussion is equally applicable to the processing node 1500 of FIG. 15 where the modules 1400 may be implemented at one of the processing nodes 1500 or distributed across multiple processing nodes 1500 and/or distributed across the processing node(s) 1500 and the control system 1302. The IAB node 902-2 and the parent IAB node 902-1 are examples of the radio access node 1320 illustrated in FIG. 15. Thus, the IAB node 902-2 and the parent IAB node 902-1 include one or more modules 1400, for example Medium Access Control (MAC) modules. Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CE Control Element
CPU Central Processing Unit
DN Data Network
DSP Digital Signal Processor
eNB Enhanced or Evolved Node B
EPS Evolved Packet System
E-UTRA Evolved Universal Terrestrial Radio Access
FDD Frequency Division Duplex
FPGA Field Programmable Gate Array
gNB New Radio Base Station
gNB-CU New Radio Base Station Central Unit
gNB-CU-CP New Radio Base Station Central Unit Control Plane
gNB-CU-UP New Radio Base Station Central Unit User Plane
gNB-DU New Radio Base Station Distributed Unit
HSS Home Subscriber Server IAB Integrated Access and Backhaul IAB-DU Integrated Access and Backhaul Distributed Unit IAB-MT Integrated Access and Backhaul Mobile Termination IoT Internet of Things IP Internet Protocol LTE Long Term Evolution MAC Medium Access Control MME Mobility Management Entity MTC Machine Type Communication NEF Network Exposure Function NF Network Function NR New Radio NRF Network Function Repository Function NSSF Network Slice Selection Function PC Personal Computer PCF Policy Control Function PDCP Packet Data Convergence Protocol P-GW Packet Data Network Gateway QoS Quality of Service RAM Random Access Memory RAN Radio Access Network RLC Radio Link Control RNL Radio Network Layer ROM Read Only Memory RRC Radio Resource Control RRH Remote Radio Head RU Round Trip Time SCEF Service Capability Exposure Function SCS Sub-Carrier Spacing SMF Session Management Function TDD Time Division Duplex TDM Time-Division Multiplexing TNL Transport Network Layer UDM Unified Data Management UE User Equipment UPF User Plane Function Those skilled in the art will recognize improvements and modifications to the embodiments of the present disclosure. All such improvements and modifications are considered within the scope of the concepts disclosed herein.

The invention claimed is:

1. A method performed by an Integrated Access and Backhaul, IAB, node, comprising:

sending to a parent IAB node, one or more sets of desired numbers of guard symbols for two or more timing switching groups, respectively, wherein:

each timing switching group of the two or more timing switching groups comprises one or more timing alignment cases; and each set of desired numbers of guard symbols comprises a desired number of guard symbols for the one or more timing alignment cases comprised in the respective timing switching group of the two or more timing switching groups;

receiving, from the parent IAB node, one or more sets of provided numbers of guard symbols for the two or more timing switching groups, respectively; and determining available time resources for one or more of: uplink transmission and downlink reception in two adjacent time units based on one of the one or more sets of provided numbers of guard symbols for one of the two or more timing switching groups that corresponds to timing alignment cases used in the two adjacent time units.

2. The method of claim 1, wherein:

the IAB node comprises an IAB-Mobility Termination, IAB-MT, and an IAB-Distributed Unit, IAB-DU; and the desired numbers of guard symbols are numbers of symbols that the IAB-MT indicates to the parent IAB node not to use for the IAB-MT in slots where the IAB node transitions between the IAB-MT and the IAB-DU.

3. The method of claim 1, wherein:

the IAB node comprises an IAB-Mobility Termination, IAB-MT, and an IAB-Distributed Unit, IAB-DU; and the provided numbers of guard symbols are numbers of symbols that are not be used for the IAB-MT in slots where the IAB node transitions between IAB-MT and IAB-DU.

4. The method of claim 1 further comprising performing one or more of: uplink transmission and downlink reception in the two adjacent time units based on the determined available time resources.

5. The method of claim 1, wherein the two or more timing switching groups comprise one or more of the following:

a first timing switching group comprising one or more of the following timing alignment cases:

Switching from IAB-MT Rx in timing Case #1 to IAB-DU Tx in timing Case #1;

Switching from IAB-MT Rx in timing Case #1 to IAB-DU Rx in timing Case #1;

Switching from IAB-MT Tx in timing Case #1 to IAB-DU Tx in timing Case #1;

Switching from IAB-MT Tx in timing Case #1 to IAB-DU Rx in timing Case #1;

Switching from IAB-DU Rx in timing Case #1 to IAB-MT Tx in timing Case #1;

Switching from IAB-DU Rx in timing Case #1 to IAB-MT Rx in timing Case #1;

Switching from IAB-DU Tx in timing Case #1 to IAB-MT Tx in timing Case #1;

Switching from IAB-DU Tx in timing Case #1 to IAB-MT Rx in timing Case #1;

a second timing switching group comprising one or more of the following timing alignment cases:

Switching from IAB-MT Rx in timing Case #1 to IAB-DU Tx in timing Case #6;

Switching from IAB-MT Rx in timing Case #1 to IAB-DU Rx in timing Case #7;

Switching from IAB-MT Tx in timing Case #1 to IAB-DU Tx in timing Case #6;

Switching from IAB-MT Tx in timing Case #1 to IAB-DU Rx in timing Case #7;

Switching from IAB-DU Rx in timing Case #1 to IAB-MT Tx in timing Case #6;

Switching from IAB-DU Rx in timing Case #1 to IAB-MT Rx in timing Case #7;

Switching from IAB-DU Tx in timing Case #1 to IAB-MT Tx in timing Case #6;

Switching from IAB-DU Tx in timing Case #1 to IAB-MT Rx in timing Case #7;

a third timing switching group comprising one or more of the following timing alignment cases:

Switching from IAB-MT Rx in timing Case #7 to IAB-DU Tx in timing Case #1;

Switching from IAB-MT Rx in timing Case #7 to IAB-DU Rx in timing Case #1;

Switching from IAB-MT Tx in timing Case #6 to IAB-DU Tx in timing Case #1;

Switching from IAB-MT Tx in timing Case #6 to IAB-DU Rx in timing Case #1;

Switching from IAB-DU Rx in timing Case #7 to IAB-MT Tx in timing Case #1;

Switching from IAB-DU Rx in timing Case #7 to IAB-MT Rx in timing Case #1;

Switching from IAB-DU Tx in timing Case #6 to IAB-MT Tx in timing Case #1;

Switching from IAB-DU Tx in timing Case #6 to IAB-MT Rx in timing Case #1;

a fourth timing switching group comprising one or more of the following timing alignment cases:

Switching from IAB-MT Rx in timing Case #7 to IAB-DU Tx in timing Case #6;

Switching from IAB-MT Rx in timing Case #7 to IAB-DU Rx in timing Case #7;

Switching from IAB-MT Tx in timing Case #6 to IAB-DU Tx in timing Case #6;

Switching from IAB-MT Tx in timing Case #6 to IAB-DU Rx in timing Case #7;

Switching from IAB-DU Rx in timing Case #7 to IAB-MT Tx in timing Case #6;

Switching from IAB-DU Rx in timing Case #7 to IAB-MT Rx in timing Case #7;

Switching from IAB-DU Tx in timing Case #6 to IAB-MT Tx in timing Case #6;

Switching from IAB-DU Tx in timing Case #6 to IAB-MT Rx in timing Case #7.

6. The method of claim 1, wherein sending the one or more sets of desired numbers of guard symbols for two or more timing switching groups, respectively, to the parent IAB node comprises sending the one or more sets of desired numbers of guard symbols for two or more timing switching groups, respectively, to the parent IAB node via one or more Medium Access Control Control Elements, MAC CEs.

7. The method of claim 6 wherein each MAC CE of the one or more MAC CEs comprises one or more of sub-carrier spacing, SCS, bits to indicate that the one or more sets of desired numbers of guard symbols correspond to one or more of Group-2, Group-3, or Group-4, respectively.

8. The method of claim 1, wherein receiving the one or more sets of provided numbers of guard symbols for the two or more timing switching groups, respectively, comprises receiving the one or more sets of provided numbers of guard symbols for the two or more timing switching groups, respectively, from the parent IAB node via one or more Medium Access Control Control Elements, MAC CEs.

9. The method of claim 8 wherein each MAC CE of the one or more MAC CEs comprises one or more bits that indicate one of the two or more timing switching groups for which the MAC CE contains the respective set of provided numbers of guard symbols.

10. An Integrated Access and Backhaul, IAB, node, adapted to:

send, to a parent IAB node, one or more sets of desired numbers of guard symbols for two or more timing switching groups, respectively, wherein:

each timing switching group of the two or more timing switching groups comprises one or more timing alignment cases; and each set of desired numbers of guard symbols comprises a desired number of guard symbols for the one or more timing alignment cases comprised in the respective timing switching group of the two or more timing switching groups;

receive, from the parent IAB node, one or more sets of provided numbers of guard symbols for the two or more timing switching groups, respectively; and determine available time resources for one or more of: uplink transmission and downlink reception in two adjacent time units based on one of the one or more sets of provided numbers of guard symbols for one of the two or more timing switching groups that corresponds to timing alignment cases used in the two adjacent time units.

11. A method performed by a parent Integrated Access and Backhaul, IAB, node, comprising:

receiving, from a IAB node, one or more sets of desired numbers of guard symbols for two or more timing switching groups, respectively, wherein:

each timing switching group of the two or more timing switching groups comprises one or more timing alignment cases; and each set of desired numbers of guard symbols comprises a desired number of guard symbols for the one or more timing alignment cases comprised in the respective timing switching group of the two or more timing switching groups;

sending, to the IAB node, one or more sets of provided numbers of guard symbols for the two or more timing switching groups, respectively;

determining available time resources for one or more of: uplink transmission and downlink reception in two adjacent time units based on one of the one or more sets of provided numbers of guard symbols for one of the two or more timing switching groups that corresponds to timing alignment cases used in the two adjacent time units.

12. The method of claim 11, wherein:

the IAB node comprises an IAB-Mobility Termination, IAB-MT, and an IAB-Distributed Unit, IAB-DU, and the desired numbers of guard symbols are numbers of symbols that the IAB-MT indicates to the parent IAB node not to use for the IAB-MT in slots where the IAB node transitions between the IAB-MT and the IAB-DU.

13. The method of claim 11, wherein:

the IAB node comprises an IAB-Mobility Termination, IAB-MT, and an IAB-Distributed Unit, IAB-DU, and the provided numbers of guard symbols are numbers of symbols that are not be used for the IAB-MT in slots where the IAB node transitions between the IAB-MT and the IAB-DU.

14. The method of claim 11 further comprising performing one or more of: uplink transmission and downlink reception in the two adjacent time units based on the determined available time resources.

15. The method of claim 11, wherein the two or more timing switching groups comprise one or more of the following:

a first timing switching group comprising one or more of the following timing alignment cases:

Switching from IAB-MT Rx in timing Case #1 to IAB-DU Tx in timing Case #1;

Switching from IAB-MT Rx in timing Case #1 to IAB-DU Rx in timing Case #1;

Switching from IAB-MT Tx in timing Case #1 to IAB-DU Tx in timing Case #1;

Switching from IAB-MT Tx in timing Case #1 to IAB-DU Rx in timing Case #1;

Switching from IAB-DU Rx in timing Case #1 to IAB-MT Tx in timing Case #1;

Switching from IAB-DU Rx in timing Case #1 to IAB-MT Rx in timing Case #1;

Switching from IAB-DU Tx in timing Case #1 to IAB-MT Tx in timing Case #1;

Switching from IAB-DU Tx in timing Case #1 to IAB-MT Rx in timing Case #1;

a second timing switching group comprising one or more of the following timing alignment cases:

Switching from IAB-MT Rx in timing Case #1 to IAB-DU Tx in timing Case #6;

Switching from IAB-MT Rx in timing Case #1 to IAB-DU Rx in timing Case #7;

Switching from IAB-MT Tx in timing Case #1 to IAB-DU Tx in timing Case #6;

Switching from IAB-MT Tx in timing Case #1 to IAB-DU Rx in timing Case #7;

Switching from IAB-DU Rx in timing Case #1 to IAB-MT Tx in timing Case #6;

Switching from IAB-DU Rx in timing Case #1 to IAB-MT Rx in timing Case #7;

Switching from IAB-DU Tx in timing Case #1 to IAB-MT Tx in timing Case #6;

Switching from IAB-DU Tx in timing Case #1 to IAB-MT Rx in timing Case #7;

a third timing switching group comprising one or more of the following timing alignment cases:

Switching from IAB-MT Rx in timing Case #7 to IAB-DU Tx in timing Case #1;

Switching from IAB-MT Rx in timing Case #7 to IAB-DU Rx in timing Case #1;

Switching from IAB-MT Tx in timing Case #6 to IAB-DU Tx in timing Case #1;

Switching from IAB-MT Tx in timing Case #6 to IAB-DU Rx in timing Case #1;

Switching from IAB-DU Rx in timing Case #7 to IAB-MT Tx in timing Case #1;

Switching from IAB-DU Rx in timing Case #7 to IAB-MT Rx in timing Case #1;

Switching from IAB-DU Tx in timing Case #6 to IAB-MT Tx in timing Case #1;

Switching from IAB-DU Tx in timing Case #6 to IAB-MT Rx in timing Case #1;

a fourth timing switching group comprising one or more of the following timing alignment cases:

Switching from IAB-MT Rx in timing Case #7 to IAB-DU Tx in timing Case #6;

Switching from IAB-MT Rx in timing Case #7 to IAB-DU Rx in timing Case #7;

Switching from IAB-MT Tx in timing Case #6 to IAB-DU Tx in timing Case #6;

Switching from IAB-MT Tx in timing Case #6 to IAB-DU Rx in timing Case #7;

Switching from IAB-DU Rx in timing Case #7 to IAB-MT Tx in timing Case #6;

Switching from IAB-DU Rx in timing Case #7 to IAB-MT Rx in timing Case #7;

Switching from IAB-DU Tx in timing Case #6 to IAB-MT Tx in timing Case #6;

Switching from IAB-DU Tx in timing Case #6 to IAB-MT Rx in timing Case #7.

16. The method of claim 11, wherein receiving the one or more sets of desired numbers of guard symbols for two or more timing switching groups, respectively, from the IAB node comprises receiving the one or more sets of desired numbers of guard symbols for two or more timing switching groups, respectively, from the IAB node via one or more Medium Access Control Control Elements, MAC CEs.

17. The method of claim 16 wherein each MAC CE of the one or more MAC CEs comprises one or more of sub-carrier spacing, SCS, bits to indicate that the one or more sets of desired numbers of guard symbols correspond to one or more of Group-2, Group-3, or Group-4, respectively.

18. The method of claim 11, wherein sending the one or more sets of provided numbers of guard symbols for the two or more timing switching groups, respectively, comprises sending the one or more sets of provided numbers of guard symbols for the two or more timing switching groups, respectively, to the IAB node via one or more MAC CEs.

19. The method of claim 18 wherein each MAC CE of the one or more MAC CEs comprises one or more bits that indicate one of the two or more timing switching groups for which the MAC CE contains the respective set of provided numbers of guard symbols.

20. A parent Integrated Access and Backhaul, IAB, node, adapted to:

receive, from a IAB node, one or more sets of desired numbers of guard symbols for two or more timing switching groups, respectively, wherein:

each timing switching group of the two or more timing switching groups comprises one or more timing alignment cases; and each set of desired numbers of guard symbols comprises a desired number of guard symbols for the one or more timing alignment cases comprised in the respective timing switching group of the two or more timing switching groups;

send, to the IAB node, one or more sets of provided numbers of guard symbols for the two or more timing switching groups, respectively;

determine available time resources for one or more of: uplink transmission and downlink reception in two adjacent time units based on one of the one or more sets of provided numbers of guard symbols for one of the two or more timing switching groups that corresponds to timing alignment cases used in the two adjacent time units.

\* \* \* \* \*